United States Patent
Ito et al.

(10) Patent No.: US 11,374,657 B2
(45) Date of Patent: Jun. 28, 2022

(54) WIRELESS COMMUNICATION SYSTEM, ACCOMMODATION STATION APPARATUS AND WIRELESS COMMUNICATION METHOD

(71) Applicant: NIPPON TELEGRAPH AND TELEPHONE CORPORATION, Tokyo (JP)

(72) Inventors: Kota Ito, Musashino (JP); Mizuki Suga, Musashino (JP); Yushi Shirato, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/422,330

(22) PCT Filed: Jan. 16, 2020

(86) PCT No.: PCT/JP2020/001249
§ 371 (c)(1),
(2) Date: Jul. 12, 2021

(87) PCT Pub. No.: WO2020/153222
PCT Pub. Date: Jul. 30, 2020

(65) Prior Publication Data
US 2022/0109505 A1 Apr. 7, 2022

(30) Foreign Application Priority Data
Jan. 23, 2019 (JP) .............................. JP2019-009434

(51) Int. Cl.
*H04B 10/548* (2013.01)
*H04J 14/02* (2006.01)
*H04B 10/11* (2013.01)

(52) U.S. Cl.
CPC .......... *H04B 10/548* (2013.01); *H04B 10/11* (2013.01); *H04J 14/02* (2013.01)

(58) Field of Classification Search
CPC ......... H04B 10/548; H04B 10/11; H04J 14/02
See application file for complete search history.

(56) References Cited

U.S. PATENT DOCUMENTS 7,085,497 B2 * 8/2006 Tiemann .......... H04B 10/25755
398/115
10,326,532 B2 * 6/2019 Ashrafi ................. H04J 3/1652
(Continued)

FOREIGN PATENT DOCUMENTS

CN 107332618 A * 11/2017 ....... H04B 10/25753
JP 4246724 B2 4/2009
(Continued)

OTHER PUBLICATIONS

Dennis T. K. Tong et al., "A Novel Multiwavelength Optically Controlled Phased Array Antenna with a Programmable Dispersion Matrix", IEEE Photonics Technology Letters, Jun. 1996, vol. 8, No. 6, p. 812-814.

*Primary Examiner* — Abbas H Alagheband
(74) *Attorney, Agent, or Firm* — Harness, Dickey & Pierce, P.L.C.

(57) ABSTRACT

To n antenna elements of the base station, n wavelengths set at predetermined intervals in a range in which chromatic dispersion in an optical fiber between accommodation and base stations can be regarded as constant are assigned. The accommodation station adjusts the phases of optical signals of the wavelengths or modulated signals that modulate the optical signals such that the amounts of phase shift of their RF signals are at predetermined intervals. The accommodation station transmits beacon signals multiple times while varying a transmission phase shift interval $\alpha_1$ and the terminal transmits beacon number information of a beacon (Continued)

signal selected based on received power multiple times. The accommodation station varies a reception phase shift interval $\alpha_2$ for each piece of beacon number information to determine a reception phase shift interval $\alpha_2$ which maximizes the received power and determines the transmission phase shift interval $\alpha_1$ based on the beacon number information received from the terminal.

8 Claims, 22 Drawing Sheets

(56) References Cited

U.S. PATENT DOCUMENTS

| | | | |
|---|---|---|---|
| 10,862,208 B2 * | 12/2020 | Hasegawa | H01Q 3/2682 |
| 10,978,801 B2 * | 4/2021 | Hasegawa | H01Q 3/2682 |
| 2005/0100102 A1 * | 5/2005 | Gazdzinski | H04B 1/7163 |
| | | | 375/242 |
| 2013/0234831 A1 * | 9/2013 | Sabesan | G06K 7/10346 |
| | | | 340/10.2 |
| 2017/0181010 A1 * | 6/2017 | Burgess | H04W 72/12 |
| 2018/0351652 A1 * | 12/2018 | Ashrafi | H04L 41/142 |

FOREIGN PATENT DOCUMENTS

| | | |
|---|---|---|
| JP | 2016225817 A * | 12/2016 |
| JP | 6249838 B2 * | 12/2017 |

\* cited by examiner

WIRELESS COMMUNICATION SYSTEM, ACCOMMODATION STATION APPARATUS AND WIRELESS COMMUNICATION METHOD

CROSS-REFERENCE TO RELATED APPLICATIONS

This application is a 371 U.S. National Phase of International Application No. filed on Jan. 16, 2020, which claims priority to Japanese Application No. 2019-009434 filed on Jan. 23, 2019. The entire disclosures of the above applications are incorporated herein by reference.

TECHNICAL FIELD

The present invention relates to a wireless communication system, an accommodation station apparatus, and a wireless communication method.

BACKGROUND ART

In wireless communication services, millimeter wave bands are attracting attention as frequency bands capable of high-speed transmission. However, there is a problem in which long-distance transmission is difficult with millimeter wave bands because their propagation loss is great.

A radio over fiber (RoF) system is known as a solution to this problem. In the RoF system, an accommodation station (a master station) modulates the intensity of an optical carrier with a radio frequency (RF) signal to be transmitted and transmits the modulated signal through an optical fiber. A base station (a slave station) reconverts the optical signal received through the optical fiber to the RF signal and radiates the reconverted RF signal through an antenna as a radio wave. Use of such an RoF system enables long-distance transmission of RF signals of millimeter wave bands.

However, when the RoF system is applied to millimeter wave bands, another issue arises involving expanding the coverage of the base station. One solution is beamforming using an array antenna. In the beamforming using an array antenna, the phases of RF signals incident on antenna elements of the array antenna are controlled such that radio waves radiated from the antenna elements interfere with each other. This controls an overall radiation direction of radio waves.

Regarding beamforming in the RoF system, in the related art, the phases of RF signals incident on antenna elements are controlled by controlling the wavelengths of optical carriers utilizing the fact that delay differences occur between optical signals of wavelengths due to chromatic dispersion during transmission through an optical fiber (see, for example, Patent Document 1).

FIG. 20 is a block diagram of an RoF system 900 to which the technique of Patent Document 1 is applied. A multi-wavelength variable light source 911 in an accommodation station 910 outputs a plurality of optical signals. The wavelength intervals between the optical signals can be changed arbitrarily. An optical modulator 912 modulates an optical signal of each wavelength with an RF signal to be transmitted. Thus, the optical modulator 912 outputs a plurality of optically modulated signals. Each optically modulated signal is transmitted though the optical fiber 920. Here, the optically modulated signals undergo different delay differences depending on the wavelengths due to the influence of chromatic dispersion. An optical demultiplexer 931 in a base station 930 splits a plurality of optically modulated signals transmitted through the optical fiber 920 into respective optically modulated signals of the wavelengths. A plurality of optical to electrical (O/E) converters 932-1, . . . , 932-$n$ convert the split optically modulated signals of the wavelengths into electrical signals. Antenna elements 933-1, . . . , 933-$n$ radiate the converted electrical signals as RF signals. At this time, phase differences also occur between the RF signals because of the delay differences due to chromatic dispersion during transmission through the optical fiber 920, so that directivity can be formed.

Also, there are methods for performing beamforming of an array antenna using optical signals without being limited to the RoF system. As one of the methods, in the related art, wavelengths are not controlled but fixed wavelengths are assigned to antenna elements and chromatic dispersion or path differences are used to cause delay differences between optical signals of the wavelengths (see, for example, Non Patent Document 1).

FIG. 21 is a diagram of a wireless system 905 to which the technique of Non Patent Document 1 is applied. A multi-wavelength light source 951 outputs a plurality of optical signals of different wavelengths. An optical modulator 952 modulates an optical signal of each wavelength with an RF signal to be transmitted. Thus, the optical modulator 952 outputs a plurality of optically modulated signals. Each optically modulated signal is sent to a programmable dispersion matrix (PDM) 953.

FIG. 22 is a block diagram illustrating the configuration of the PDM 953. The PDM 953 includes n+1 pieces of 2×2 optical switches 961-1, . . . , 961-($n$+1) and n dispersion elements 962-1, 962-2, . . . , 962-$n$ which have dispersion values of $D_0, 2D_0, \ldots, 2^{n-1}D_0$, respectively. The dispersion elements 962-1, . . . , 962-$n$ are each made of a dispersion fiber, a grating fiber, or the like. The PDM 953 adjusts the dispersion values as a whole by switching the 2×2 optical switches 961-1, . . . , 961-($n$+1). The optically modulated signals input to the PDM 953 undergo different delay differences depending on the dispersion values adjusted by the PDM 953.

An optical demultiplexer 954 in the wireless system 905 illustrated in FIG. 21 splits a plurality of optically modulated signals output from the PDM 953 into respective optically modulated signals of the wavelengths. This optical splitting is fixed because the wavelengths are preset corresponding to antenna elements 956-1, . . . , 956-$n$. A plurality of optical to electrical (O/E) converters 955-1, . . . , 955-$n$ convert the split optically modulated signal of the wavelengths into electrical signals. The antenna elements 956-1, . . . , 956-$n$ radiate the converted electrical signals as RF signals. At this time, phase differences also occur between the RF signals because of the delay differences due to the dispersion of the PDM 953, so that directivity can be formed.

CITATION LIST

Patent Document

Patent Document 1: JP 4246724 B

Non Patent Document

Non Patent Document 1: Dennis TK Tong, Ming C. Wu, "A Novel Multiwavelength Optically Controlled Phased Array Antenna with a Programmable Dispersion Matrix", IEEE Photonics Technology Letters, June 1996, VOL. 8, NO. 6, pp. 812-814

SUMMARY OF THE INVENTION

Technical Problem

The technique of Patent Document 1 makes wavelengths variable and dispersion fixed to cause delay differences between modulated optical signals as described above. Here, it is necessary to greatly adjust the wavelength interval between optically modulated signals depending on the direction in which the directivity is formed, the fiber length, and the frequency of the RF signal. This increases the width of a wavelength band to be used and thus the wavelength utilization efficiency seems to be lowered. Different wavelengths must be used for base stations particularly in a wavelength division multiplex-passive optical network (WDM-PON). If the technique of Patent Document 1 is applied to such a situation, a wavelength band for beamforming must also be preset in the WDM-PON, greatly expanding the wavelength band to be used.

Further, in the technique of Patent Document 1, the wavelengths are adjusted for directivity formation. Thus, it is also necessary to adjust wavelengths sent to the antenna elements of the base station. Therefore, the optical demultiplexer of the base station needs to change the wavelengths sent to the antenna elements of the base station every time the directivity is formed, and when the directivity is changed dynamically, splitting of the optical demultiplexer also needs to be changed dynamically. This means that it is necessary to control the optical demultiplexer of the base station.

One advantage of applying the RoF system is that the base station can be simplified by consolidating the functions into the accommodation station, in addition to the long-distance transmission of RF signals. However, the technique of Patent Document 1 requires control of the optical demultiplexer of the base station, limiting the simplification of the base station.

Furthermore, the technique of Patent Document 1 requires distance information of the optical fiber in the wavelength adjustment for adjusting the delay differences between optically modulated signals. In general, the distance information of the optical fiber from the accommodation station to the base station is considered to be unknown, or even if known, the exact length cannot be known. It is very difficult to measure the fiber length particularly when the optical fiber is in a passive optical network (PON) configuration. The applicable range of Patent Document 1 seems to be very limited because it requires accurate distance information of an optical fiber.

On the other hand, the technique of Non Patent Document 1 makes the wavelengths fixed and the dispersion variable to cause delay differences between modulated optical signals. Here, the wavelength utilization efficiency is better than that of Patent Document 1 because the wavelengths are fixed. It is also unnecessary to control the optical demultiplexer because the optical splitting is fixed. However, high accuracy seems to be required for the design and manufacture of the PDM for adjusting the dispersion. Thus, there is a risk of increasing the size and cost of apparatuses.

In addition, Non Patent Document 1 does not mention application to RoF. Therefore, when RoF is applied to Non Patent Document 1 for long-distance optical fiber transmission, the influence of chromatic dispersion during transmission through the optical fiber must be taken into consideration, in addition to the dispersion adjustment by the PDM. Further, both Patent Document 1 and Non Patent Document 1 mention only beamforming of transmitting antennas and do not mention beamforming of receiving antennas.

In view of the above circumstances, it is an object of the present invention to provide a wireless communication system, an accommodation station apparatus, and a wireless communication method which can perform beamforming of transmitting and receiving antennas of an RoF system while limiting deterioration of wavelength utilization efficiency and cost increase without requiring base station control and optical fiber distance information.

Means for Solving the Problem

An aspect of the present invention provides a wireless communication system including an accommodation station apparatus; a base station apparatus that is connected to the accommodation station apparatus through an optical transmission line and has n antenna elements where n is an integer of 2 or more; and a terminal configured to wirelessly communicate with the base station apparatus. The accommodation station apparatus includes: a transmission unit configured to adjust phases of optically modulated transmission signals, obtained respectively by modulating light of n different first wavelengths with a transmission signal, by first amounts of phase adjustment corresponding respectively to the n different first wavelengths and output a combined optically modulated transmission signal obtained by combining the phase-adjusted optically modulated transmission signals of the n different first wavelengths to the optical transmission line; a transmission phase control unit configured to, when transmitting p beacon signals where p is an integer of 2 or more as the transmission signal, control the transmission unit such that the transmission unit adjusts phases of the p beacons signals by the first amounts of phase adjustment which differ between the p beacon signals; a reception unit configured to demultiplex a combined optically modulated received signal transmitted through the optical transmission line into optically modulated received signals of n different second wavelengths and convert the demultiplexed optically modulated received signals into electrical signals which have been phase-adjusted by second amounts of phase adjustment corresponding respectively to the n different second wavelengths; a reception phase control unit configured to, when q combined optically modulated received signals where q is an integer of 2 or more indicating identification information of a beacon signal selected from the p beacon signals based on the terminal's received powers of the p beacon signals have been input from the optical transmission line, control the reception unit such that the reception unit adjusts phases of the q combined optically modulated received signals by the second amounts of phase adjustment which differ between the q combined optically modulated received signals; a transmission phase adjustment amount determination unit configured to control the transmission unit such that the transmission unit performs phase adjustment by the first amounts of phase adjustment that have been used for the beacon signal of the identification information indicated by the combined optically modulated received signals; and a reception phase adjustment amount determination unit configured to control the reception unit such that the reception unit performs phase adjustment by the second amounts of phase adjustment that have been used for a combined optically modulated received signal selected from the q combined optically modulated received signals based on received powers of electrical signals into which the q combined optically modulated received signals have been converted. The base station apparatus includes: a base station optical demultiplexing unit configured to demultiplex the combined optically modulated transmission signal transmitted through the optical transmission line into optically modulated transmission signals of the n different first wavelengths; an optical to electrical conversion unit configured to convert the optically modulated transmission signals of the n first wavelengths into electrical signals and radiate the electrical signals wirelessly from the antenna elements corresponding respectively to the n first wavelengths; an electrical to optical conversion unit configured to modulate optical signals of the n different second wavelengths corresponding respectively to the n antenna elements with wireless signals that the n antenna elements have received from the terminal to generate optically modulated received signals; and a base station optical combining unit configured to output a combined optically modulated received signal obtained by combining the optically modulated received signals of the n second wavelengths generated by the electrical to optical conversion unit to the optical transmission line. The terminal includes: a wireless reception unit configured to receive a wireless signal from the base station apparatus; a wireless transmission unit configured to transmit a wireless signal to the base station apparatus; and a beacon selection unit configured to, when the wireless reception unit has received the p beacon signals, cause the wireless transmission unit to transmit q wireless signals indicating the identification information of the beacon signal selected based on the received powers of the p beacon signals.

An aspect of the present invention provides the above wireless communication system, wherein the n antenna elements are arranged at predetermined intervals, the n first wavelengths are wavelengths at first wavelength intervals included in a range in which chromatic dispersion in the optical transmission line is capable of being regarded as constant, the n second wavelengths are wavelengths at second wavelength intervals included in a range in which chromatic dispersion in the optical transmission line is capable of being regarded as constant, the n first amounts of phase adjustment are amounts of phase adjustment which make phases of wireless signals spaced at first phase intervals, and the n second amounts of phase adjustment are amounts of phase adjustment which make phases of wireless signals spaced at second phase intervals.

An aspect of the present invention provides the above wireless communication system, wherein the transmission unit includes: an optical modulation unit configured to modulate light of the n different first wavelengths with the transmission signal to generate optically modulated transmission signals; a phase adjustment unit configured to adjust phases of the optically modulated transmission signals of the n first wavelengths generated by the optical modulation unit by the first amounts of phase adjustment corresponding respectively to the first wavelengths; and an optical combining unit configured to combine the optically modulated transmission signals of the n first wavelengths which have been phase-adjusted by the phase adjustment unit to generate a combined optically modulated transmission signal and output the combined optically modulated transmission signal to the optical transmission line.

An aspect of the present invention provides the above wireless communication system, wherein the transmission unit includes: a splitting unit configured to split the transmission signal into n transmission signals corresponding respectively to the n different first wavelengths; a phase adjustment unit configured to adjust phases of the n transmission signals split by the splitting unit by the first amounts of phase adjustment corresponding to the first wavelengths corresponding to the n transmission signals; an optical modulation unit configured to modulate light of the n different first wavelengths with the transmission signals which have been phase-adjusted by the first amounts of phase adjustment corresponding to the first wavelengths to generate optically modulated transmission signals; and an optical combining unit configured to combine the optically modulated transmission signals of the n first wavelengths generated by the optical modulation unit to generate a combined optically modulated transmission signal and output the combined optically modulated transmission signal to the optical transmission line.

An aspect of the present invention provides the above wireless communication system, wherein the reception unit includes: a demultiplexing unit configured to demultiplex the combined optically modulated received signal into optically modulated received signals of the n second wavelengths; a phase adjustment unit configured to adjust phases of the optically modulated received signals of the n second wavelengths demultiplexed by the demultiplexing unit by the second amounts of phase adjustment corresponding to the second wavelengths; a combining unit configured to combine the optically modulated received signals of the n second wavelengths which have been phase-adjusted by the phase adjustment unit; and a conversion unit configured to convert the optically modulated received signals combined by the combining unit into electrical signals.

An aspect of the present invention provides the above wireless communication system, wherein the reception unit includes: a demultiplexing unit configured to demultiplex the combined optically modulated received signal into optically modulated received signals of the n second wavelengths; a conversion unit configured to convert the optically modulated received signals of the n second wavelengths demultiplexed by the demultiplexing unit into electrical signals; and a phase adjustment unit configured to adjust phases of the n electrical signals obtained through conversion of the conversion unit by the second amounts of phase adjustment corresponding to the second wavelengths.

An aspect of the present invention provides an accommodation station apparatus connected to a base station apparatus through an optical transmission line, the base station apparatus being configured to perform wireless communication with a terminal through n antenna elements where n is an integer of 2 or more, the accommodation station apparatus including: a transmission unit configured to adjust phases of optically modulated transmission signals, obtained respectively by modulating light of n different first wavelengths corresponding to then antenna elements with a transmission signal, by first amounts of phase adjustment corresponding respectively to the n first wavelengths and output a combined optically modulated transmission signal obtained by combining the phase-adjusted optically modulated transmission signals of the n first wavelengths to the optical transmission line; a transmission phase control unit configured to, when transmitting p beacon signals where p is an integer of 2 or more as the transmission signals, control the transmission unit such that the transmission unit adjusts phases of the p beacons signals by the first amounts of phase adjustment which differ between the p beacon signals; a reception unit configured to demultiplex a combined optically modulated received signal transmitted through the optical transmission line into optically modulated received signals of n different second wavelengths corresponding to the n antenna elements and convert the demultiplexed optically modulated received signals into electrical signals which have been phase-adjusted by second amounts of phase adjustment corresponding respectively to the n second wavelengths; a reception phase control unit configured to, when q combined optically modulated received signals where q is an integer of 2 or more indicating identification information of a beacon signal selected from the p beacon signals based on the terminal's received powers of the p beacon signals have been input from the optical transmission line, control the reception unit such that the reception unit adjusts phases of the q combined optically modulated received signals by the second amounts of phase adjustment which differ between the q combined optically modulated received signals; a transmission phase adjustment amount determination unit configured to control the transmission unit such that the transmission unit performs phase adjustment by the first amounts of phase adjustment that have been used for the beacon signal of the identification information indicated by the combined optically modulated received signals; and a reception phase adjustment amount determination unit configured to control the reception unit such that the reception unit performs phase adjustment by the second amounts of phase adjustment that have been used for a combined optically modulated received signal selected from the q combined optically modulated received signals based on received powers of electrical signals into which the q combined optically modulated received signals have been converted.

An aspect of the present invention provides a wireless communication method for a wireless communication system including an accommodation station apparatus, a base station apparatus that is connected to the accommodation station apparatus through an optical transmission line and has n antenna elements where n is an integer of 2 or more, and a terminal configured to wirelessly communicate with the base station apparatus, the wireless communication method including: a transmission step in which the accommodation station apparatus adjusts phases of optically modulated transmission signals, obtained respectively by modulating light of n different first wavelengths with a transmission signal, by first amounts of phase adjustment corresponding respectively to the n different first wavelengths, and outputs a combined optically modulated transmission signal obtained by combining the phase-adjusted optically modulated transmission signals of the n different first wavelengths to the optical transmission line; a transmission phase control step in which the accommodation station apparatus, when transmitting p beacon signals where p is an integer of 2 or more as the transmission signals in the transmission step, performs control to adjust phases of the p beacons signals by the first amounts of phase adjustment which differ between the p beacon signals; a reception step in which the accommodation station apparatus demultiplexes a combined optically modulated received signal transmitted through the optical transmission line into optically modulated received signals of n different second wavelengths and converts the demultiplexed optically modulated received signals into electrical signals which have been phase-adjusted by second amounts of phase adjustment corresponding respectively to the n second wavelengths; a reception phase control step in which the accommodation station apparatus, when q combined optically modulated received signals where q is an integer of 2 or more indicating identification information of a beacon signal selected from the p beacon signals based on the terminal's received powers of the p beacon signals have been input from the optical transmission line, performs control to adjust phases of the q combined optically modulated received signals by the second amounts of phase adjustment which differ between the q combined optically modulated received signals in the reception step; a transmission phase adjustment amount determination unit in which the accommodation station apparatus performs control to perform phase adjustment by the first amounts of phase adjustment that have been used for the beacon signal of the identification information indicated by the combined optically modulated received signals in the transmission step; a reception phase adjustment amount determination step in which the accommodation station apparatus performs control to perform phase adjustment by the second amounts of phase adjustment that have been used for a combined optically modulated received signal selected from the q combined optically modulated received signals based on received powers of electrical signals into which the q combined optically modulated received signals have been converted in the reception step; an optical demultiplexing step in which the base station apparatus demultiplexes the combined optically modulated transmission signal transmitted through the optical transmission line into optically modulated transmission signals of the n different first wavelengths; an optical to electrical conversion step in which the base station apparatus converts the optically modulated transmission signals of the n first wavelengths into electrical signals and radiates the electrical signals wirelessly from the antenna elements corresponding respectively to the n first wavelengths; an electrical to optical conversion step in which the base station apparatus modulates optical signals of the n different second wavelengths corresponding respectively to the n antenna elements with wireless signals that the n antenna elements have received from the terminal to generate optically modulated received signals; an optical combining step in which the base station apparatus outputs a combined optically modulated received signal obtained by combining the optically modulated received signals of the n second wavelengths generated in the electrical to optical conversion step to the optical transmission line; a wireless reception step in which the terminal receives a wireless signal from the base station apparatus; a wireless transmission step in which the terminal transmits a wireless signal to the base station apparatus; and a beacon selection step in which the terminal, when the p beacon signals have been received in the wireless reception step, causes q wireless signals indicating the identification information of the beacon signal selected based on the received powers of the p beacon signals to be transmitted in the wireless transmission step.

Effects of the Invention

According to the present invention, it is possible to perform beamforming of transmitting and receiving antennas of an RoF system while limiting deterioration of wavelength utilization efficiency and cost increase without requiring base station control and optical fiber distance information.

DESCRIPTION OF EMBODIMENTS

Hereinafter, embodiments of the present invention will be described in detail with reference to the drawings.

1. Overall Configuration

Figure 1:
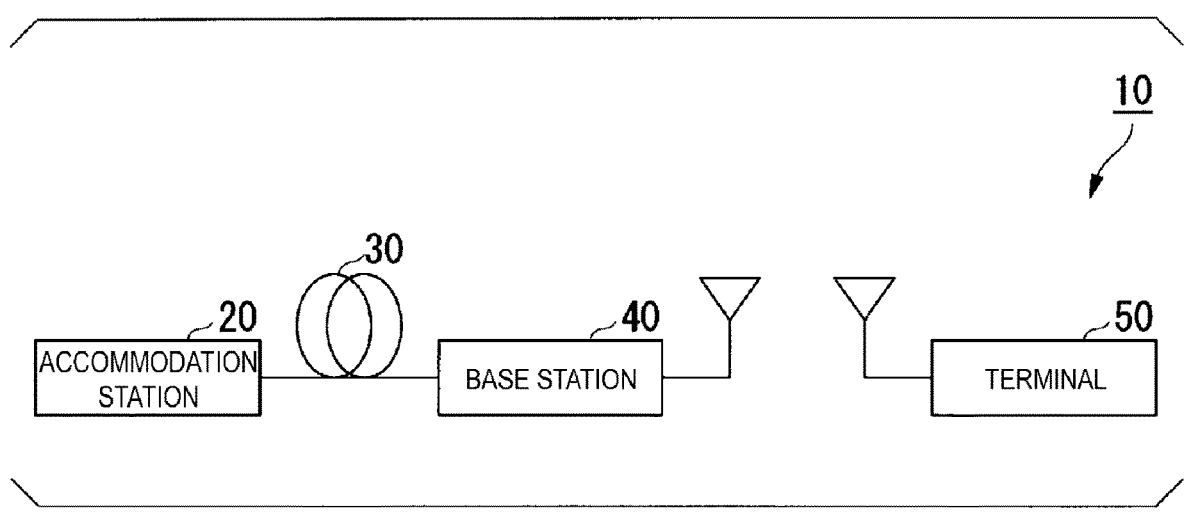
FIG. 1 is a diagram illustrating an overall configuration of a wireless communication system according to an embodiment of the present invention.

FIG. 1 is a diagram illustrating an overall configuration of a wireless communication system 10 according to an embodiment of the present invention. The wireless communication system 10 includes an accommodation station 20, a base station 40, and a terminal 50. The accommodation station 20 and the base station 40 are connected by an optical fiber 30. The accommodation station 20 and the base station 40 perform optical fiber communication, and the base station 40 and the terminal 50 perform wireless communication. The accommodation station 20, the optical fiber 30, and the base station 40 constitute, for example, an RoF system.

2. Basic Principles

Basic principles used in the wireless communication system 10 of the present embodiment will be described in the order of a principle of beamforming of transmitting antennas, a principle of beamforming of receiving antennas, and a process of determining beam directions.

2.1 Principle of Beamforming of Transmitting Antennas

Figure 2:
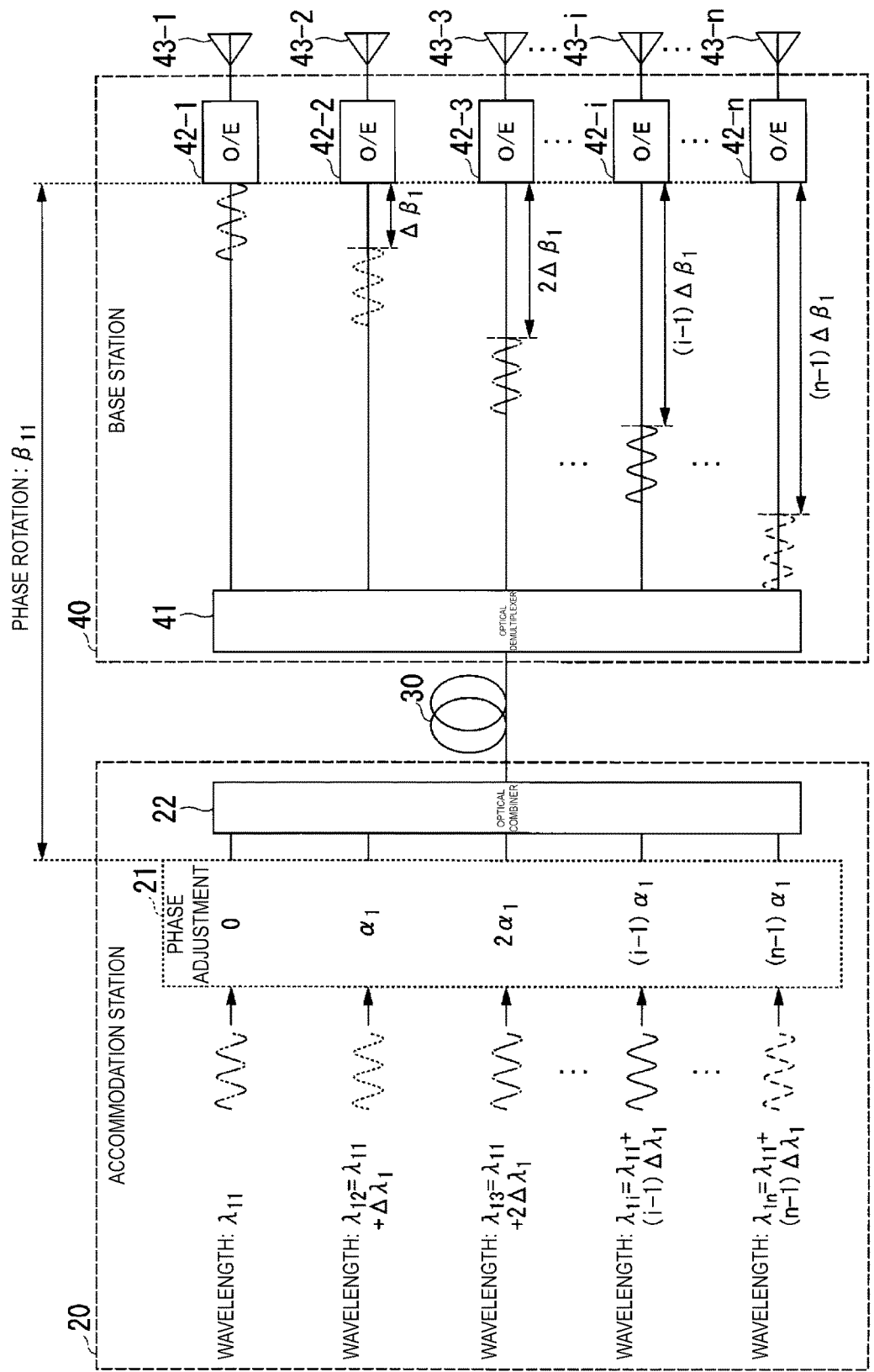
FIG. 2 is a diagram illustrating the basic principle of beamforming of transmitting antennas according to the embodiment.

FIG. 2 is a diagram illustrating the basic principle of beamforming of transmitting antennas according to the present embodiment. FIG. 2 illustrates only functional units relating to transmission. The accommodation station 20 includes a phase adjustment unit 21 and an optical combiner 22. The base station 40 includes an optical demultiplexer 41, n optical to electrical (O/E) converters 42 (where n is an integer of 2 or more), and n antenna elements 43. In the following, the n antenna elements 43 are referred to as antenna elements 43-1, ..., 43-$n$ and an O/E converter 42 connected to an antenna element 43-$i$ (i=1, ..., n) is referred to as an O/E converter 42-$i$.

The n antenna elements 43-1, ..., 43-$n$ of the base station 40 are fixedly associated with different wavelengths $\lambda_{11}, \ldots, \lambda_{1n}$, respectively. This can eliminate the need to control the optical demultiplexer of the base station as in Patent Document 1.

The wavelengths $\lambda_{11}, \ldots, \lambda_{1n}$ are assumed to be arranged at equal intervals which are sufficiently small wavelength intervals. That is, $\lambda_{1i} = \lambda_{11} + (i-1)\Delta\lambda_1$ (where i=1, ..., n) is assumed to hold for a sufficiently small wavelength interval $\Delta\lambda_1$. The dispersion values for the wavelengths $\lambda_{11}, \ldots, \lambda_{1n}$ can be considered to be equal because the wavelength interval is sufficiently small. Further, delay differences between optical signals of wavelengths $\lambda_{11}, \ldots, \lambda_{1n}$ due to chromatic dispersion when the optical signals are transmitted through the optical fiber by the same distance can be made equal because the wavelengths are at equal intervals.

Before transmitting optically modulated signals obtained by modulating light of wavelengths $\lambda_{11}, \ldots, \lambda_{1n}$ with the same RF signal through the optical fiber, the accommodation station 20 adjusts the phases of the optically modulated signals by 0, $\alpha_1$, $2\alpha_1$, ..., $(n-1)\alpha_1$ such that the phases of RF signals of the optically modulated signals are at equal intervals. That is, the phase adjustment unit 21 of the accommodation station 20 adjusts the phase of the RF signal of each optically modulated signal of wavelength $\lambda_{1i}$ (i=1, ..., n) by $(i-1)\alpha_1$.

The optical combiner 22 of the accommodation station 20 wavelength-multiplexes the optically modulated signals of wavelengths $\lambda_{11}, \ldots, \lambda_{1n}$ which have been phase-adjusted by the phase adjustment unit 21 and transmits the multiplexed optically modulated signal up to the base station 40 through the single optical fiber 30. At this time, it is unnecessary to know distance information of the optical fiber 30.

When optically modulated signals of wavelengths $\lambda_{11}, \ldots, \lambda_{1n}$ are transmitted through an optical fiber, they undergo different delay differences under the influence of chromatic dispersion and thus experience different phase rotations. Because the wavelengths $\lambda_{11}, \ldots, \lambda_{1n}$ are arranged at equal intervals which are sufficiently small wavelength intervals, the delay differences due to chromatic dispersion can also be made at equal intervals. The amounts of phase rotation of the RF signals of the optically modulated signals of wavelengths $\lambda_{11}, \ldots, \lambda_{1n}$ are also at equal intervals. That is, the amounts of phase rotation $\beta_{11}, \ldots, \beta_{1n}$ of the RF signals of the optically modulated signals of wavelengths $\lambda_{11}, \ldots, \lambda_{1n}$ are $\beta_{11}$, $\beta_{11}-2\Delta\beta_1$, ..., $\beta_{11}-(n-1)\Delta\beta_1$, respectively. The amount of phase rotation $\beta_{1i}$ (i=1, ..., n) can be expressed as $\beta_{1i}=\beta_{11}-(i-1)\Delta\beta_1$. The amounts of phase rotation $\beta_{11}, \ldots, \beta_{1n}$ of the RF signals are constants because the wavelengths $\lambda_{11}, \ldots, \lambda_{1n}$ are fixed. However, the values of the amounts of phase rotation $\beta_{11}, \ldots, \beta_{1n}$ of the RF signals cannot be specifically obtained if the distance information of the optical fiber 30 is unknown.

The optical demultiplexer 41 of the base station 40 fixedly splits the optically modulated signals of wavelengths $\lambda_{11}, \ldots, \lambda_{1n}$ transmitted through the optical fiber 30 and outputs the split optically modulated signals of wavelengths $\lambda_{1i}$ (i=1, . . . , n) to the antenna elements 43-*i*. The optically modulated signals of wavelengths $\lambda_{11}, \ldots, \lambda_{1n}$ are O/E converted respectively by the O/E converters 42-1, . . . , 42-*n* and the RF signals thereof are radiated from the antenna elements 43-1, . . . , 43-*n*, respectively. The RF signal of the optically modulated signal of wavelength $\lambda_{1i}$ (i=1, . . . , n) is phase-adjusted by (i−1)$\alpha_1$ at the accommodation station 20 and further experiences a phase rotation of $\beta_{1i}=\beta_{11}-(i-1)\Delta\beta_1$ during transmission through the optical fiber 30. Thus, the phase $\phi_{1i}$ of wavelength $\lambda_{1i}$ (i=1, . . . , n) is arranged such that $\phi_{1i}=(i-1)\alpha_1+\beta_{1i}=\beta_{11}+(i-1)(\alpha_1-\Delta\beta_1)$, and an RF signal with the phase $\phi_{1i}$ is radiated from the antenna element 43-*i*.

The phase difference between a transmitted RF signal radiated from the antenna element 43-(*i*+1) and a transmitted RF signal radiated from an adjacent antenna element 43-*i* is $\phi_{1(i+1)}-\phi_{1i}=\alpha_1-\Delta\beta_1$, which is constant regardless of the value of i.

Figure 3:
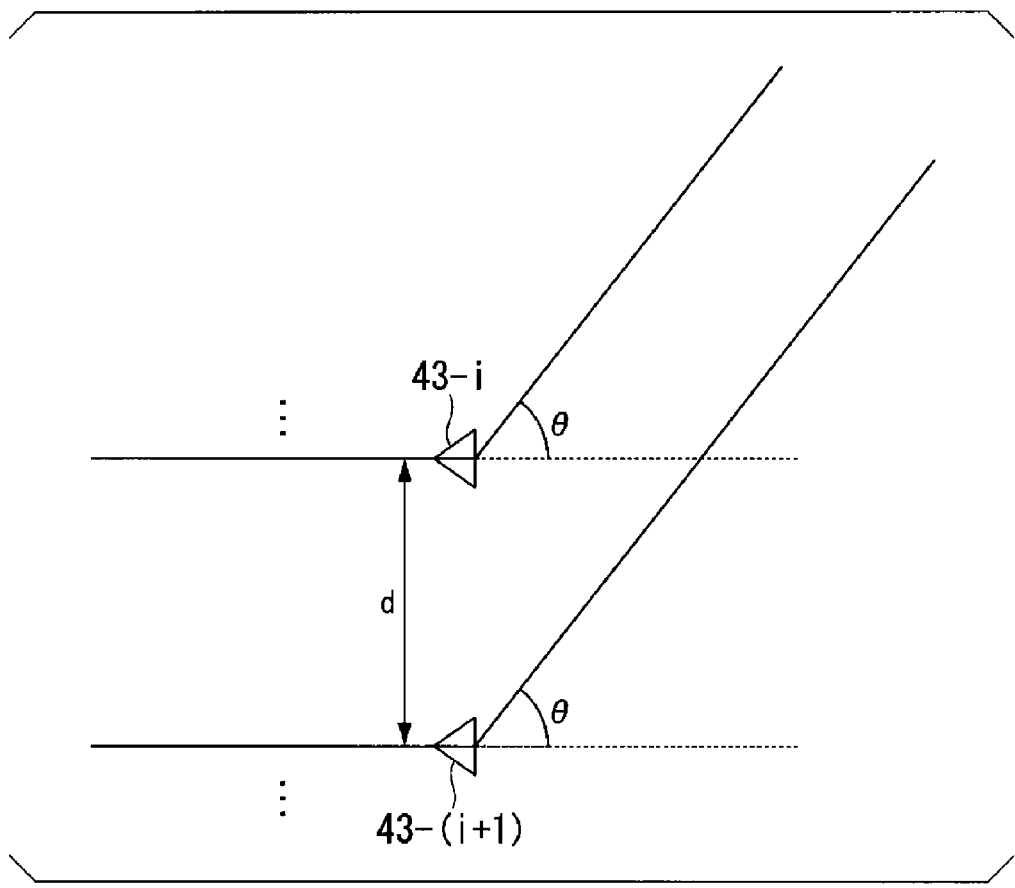
FIG. 3 is a diagram illustrating a beam direction of a base station according to the embodiment.

FIG. 3 is a diagram illustrating the beam direction of transmitted RF signals radiated from the base station 40. The antenna elements 43-1, . . . , 43-*n* are assumed to be arranged at equal intervals d. That is, the interval between the antenna element 43-*i* and the antenna element 43-(*i*+1) is d. Let $\theta$ be the transmission beam direction of each antenna element 43 and $\lambda_{RF1}$ be the wavelength of the transmitted RF signal. In this case, a transmission beam is formed in the direction satisfying the following equation (1).

[Math. 1]

$$\frac{2\pi}{\lambda_{RF1}} d\sin\theta = \alpha_1 - \Delta\beta_1 \quad (1)$$

If the distance information of the optical fiber 30 is unknown, the values of the amounts of phase rotation $\beta_{11}, \ldots, \beta_{1n}$ of the RF signals cannot be specifically obtained as described above. Therefore, $\Delta\beta_1$ is a constant whose specific value is unknown.

A variable that determines the transmission beam direction $\theta$ is only $\alpha_1$ and the transmission beam direction $\theta$ can be changed by changing the value of $\alpha_1$. Basically, there is no need to control the base station 40 in controlling the transmission beam direction because the accommodation station 20 controls the value of $\alpha_1$. However, if the distance information of the optical fiber 30 is unknown, a specific value of $\Delta\beta_1$ is unknown and therefore a specific value of the transmission beam direction $\theta$ is also unknown.

If the distance information of the optical fiber 30 is unknown, the direction of the transmission beam formed by the base station 40 is unknown. Thus, feedback from the terminal 50, which is a communication partner of the base station 40, is required to determine the transmission beam direction. A beam direction determination process will be described in detail after beamforming of the receiving antennas is described.

2.2 Principle of Beamforming of Receiving Antennas

Figure 4:
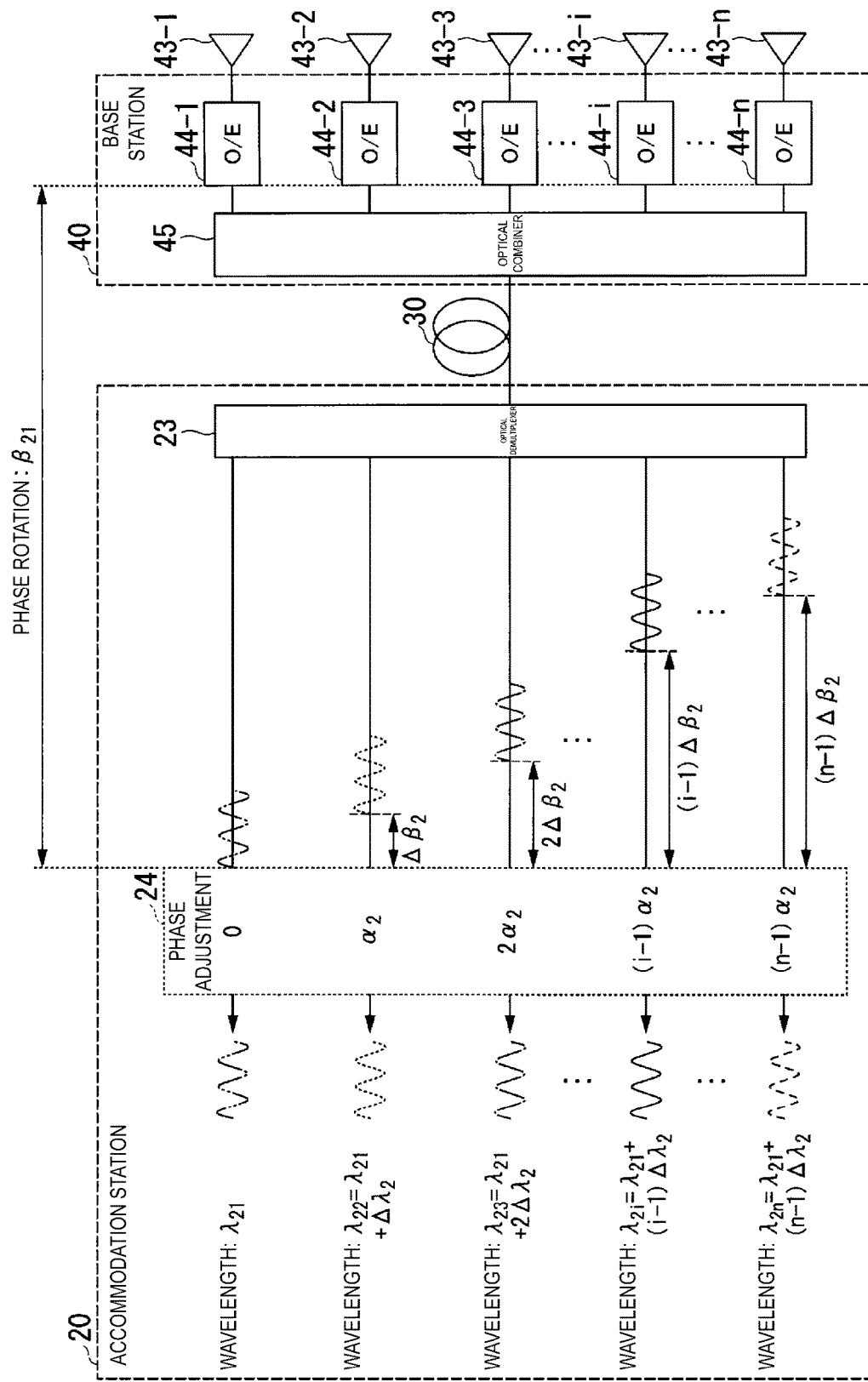
FIG. 4 is a diagram illustrating the basic principle of beamforming of receiving antennas according to the embodiment.

FIG. 4 is a diagram illustrating the basic principle of beamforming of receiving antennas in the wireless communication system 10 according to the present embodiment. FIG. 4 illustrates only functional units relating to reception.

The accommodation station 20 includes an optical demultiplexer 23 and a phase adjustment unit 24. The base station 40 includes n antenna elements 43-1, . . . , 43-*n*, n electrical to optical (E/O) converters 44, and an optical combiner 45. An E/O converter 44 connected to an antenna element 43-*i* (i=1, . . . , n) is referred to as an E/O converter 44-*i*.

The n antenna elements 43-1, . . . , 43-*n* of the base station 40 are fixedly associated with different wavelengths $\lambda_{21}, \ldots, \lambda_{2n}$, respectively. The wavelengths $\lambda_{21}, \ldots, \lambda_{2n}$ are assumed to be arranged at equal intervals which are sufficiently small wavelength intervals. That is, $\lambda_{2i}=\lambda_{21}+(i-1)\Delta\lambda_2$ (where i=1, . . . , n) is assumed to hold for a sufficiently small wavelength interval $\Delta\lambda_2$. The dispersion values for the wavelengths $\lambda_{21}, \ldots, \lambda_{2n}$ can be regarded equal because the wavelength interval is sufficiently small. Further, delay differences between optical signals of wavelengths $\lambda_{21}, \ldots, \lambda_{2n}$ due to chromatic dispersion when the optical signals are transmitted through the optical fiber by the same distance can be made equal because the wavelengths are at equal intervals.

A signal from the terminal 50 is assumed to arrive at the base station 40 in the direction $\theta$ as illustrated in FIG. 3. When the phase of an RF signal received by the antenna element 43-*i* (i=1, . . . , n) is $\phi_{2i}$ and the wavelength of the received RF signal is $\lambda_{RF2}$, the following equation (2) holds for i=1, . . . , n−1.

[Math. 2]

$$\Delta\varphi_2 = \varphi_{2(i+1)} - \varphi_{2i} = \frac{2\pi}{\lambda_{RF2}} d\sin\theta \quad (2)$$

Thus, $\phi_{2i}=\phi_{21}+(i-1)\Delta\phi_2$ (where i=1, . . . , n). The E/O converters 44-*i* (i=1, . . . , n) of the base station 40 modulate optical signals of the wavelengths $\lambda_{2i}$ using received RF signals having phases of $\phi_{2i}$ which have been received by the antenna elements 43-*i* and the optical combiner 45 wavelength-multiplexes the modulated optical signals and transmits the multiplexed optical signal up to the accommodation station 20 through the single optical fiber 30. At this time, it is unnecessary to know distance information of the optical fiber 30.

When optically modulated signals of wavelengths $\lambda_{21}, \ldots, \lambda_{2n}$ are transmitted through an optical fiber, they undergo different delay differences under the influence of chromatic dispersion and thus experience different phase rotations. Because the wavelengths $\lambda_{21}, \ldots, \lambda_{2n}$ are arranged at equal intervals which are sufficiently small wavelength intervals, the delay differences due to chromatic dispersion are at equal intervals and the amounts of phase rotation of the RF signals of the optically modulated signals of wavelengths $\lambda_{21}, \ldots, \lambda_{2n}$ are also at equal intervals. That is, the amounts of phase rotation $\beta_{21}, \ldots, \beta_{2n}$ of the RF signals of the optically modulated signals of wavelengths $\lambda_{21}, \ldots, \lambda_{2n}$ are $\beta_{21}, \beta_{21}-\Delta\beta_2, \beta_{21}-2\Delta\beta_2, \ldots \beta_{21}-(n-1)\Delta\beta_2$, respectively. The amount of phase rotation $\beta_{2i}$ can be expressed as $\beta_{2i}=\beta_{21}-(i-1)\Delta\beta_2$ (where i=1, . . . , n). The amounts of phase rotation $\beta_{21}, \ldots, \beta_{2n}$ of the RF signals are constants because the wavelengths $\lambda_{21}, \ldots \lambda_{2n}$ are fixed. However, the values of the amounts of phase rotation $\beta_{21}, \ldots, \beta_{2n}$ of the RF signals cannot be specifically obtained if the distance information of the optical fiber 30 is unknown.

The phases of the RF signals of the optically modulated signals of wavelengths $\lambda_{21}, \lambda_{22}, \lambda_{23}, \ldots, \lambda_{2n}$ received by the accommodation station 20 are $\phi_{21}+\beta_{21}$, $\phi_{21}+\beta_{21}+\Delta\phi_2-\Delta\beta_2$, $\phi_{21}+\beta_{21}+2(\Delta\phi_2-\Delta\beta_2), \ldots, \varphi_{21}+\beta_{21}+(n-1)(\Delta\phi_2-\Delta\beta_2)$.

The accommodation station 20 adjusts the phases of the optically modulated signals of wavelengths $\lambda_{21}, \ldots, \lambda_{2n}$ by $0, \alpha_2, 2\alpha_2, \ldots, (n-1)\alpha_2$ such that the phases of RF signals of the optically modulated signals are at equal intervals. That is, the phase adjustment unit 24 adjusts the phases of the RF signals of the optically modulated signals of wavelengths $\lambda_{2i}$ demultiplexed by the optical demultiplexer 23 by $(i-1)\alpha_2$. The resulting phases of the RF signals of the optically modulated signals of wavelengths $\lambda_{21}, \lambda_{22}, \lambda_{23}, \ldots, \lambda_{2n}$ are $\phi_{21}+\beta_{21}$, $\phi_{21}+\beta_{21}+\Delta\phi_2-\Delta\beta_2+\alpha_2$, $\phi_{21}+\beta_{21}+2(\Delta\phi_2-\Delta\beta_2+\alpha_2)$, ..., $\phi_{21}+\beta_{21}+(n-1)(\Delta\phi_2-\Delta\beta_2+\alpha_2)$. At this time, if $\alpha_2=\Delta\beta_2-\Delta\phi_2$, the phases of the RF signals of the optically modulated signals of wavelengths $\lambda_{21}, \ldots, \lambda_{2n}$ are in phase at $\phi_{21}+\beta_{21}$ and thus a receiving antenna beam is formed in the direction θ. The accommodation station 20 may perform such phase adjustment not on the optically modulated signals of wavelengths $\lambda_{21}, \ldots, \lambda_{2n}$, but on electrical signals obtained by E/O converting the optically modulated signals.

If the distance information of the optical fiber 30 is unknown, the values of the amounts of phase rotation $\beta_{21}, \ldots, \beta_{2n}$ of the RF signals cannot be specifically obtained as described above. Therefore, $\Delta\beta_2$ is a constant whose specific value is unknown and a value of $\alpha_2=\Delta\beta_2-\Delta\phi_2$ corresponding to the reception beam direction θ cannot be specifically obtained. Thus, values of $\alpha_2$ are scanned to obtain a value of $\alpha_2=\Delta\beta_2-\Delta\phi_2$ that maximizes the received power. Basically, there is no need to control the base station 40 in controlling the reception beam direction because the accommodation station 20 controls the value of $\alpha_2$.

2.3 Process of Determining Beam Directions of Transmitting/Receiving Antennas

Figure 5:
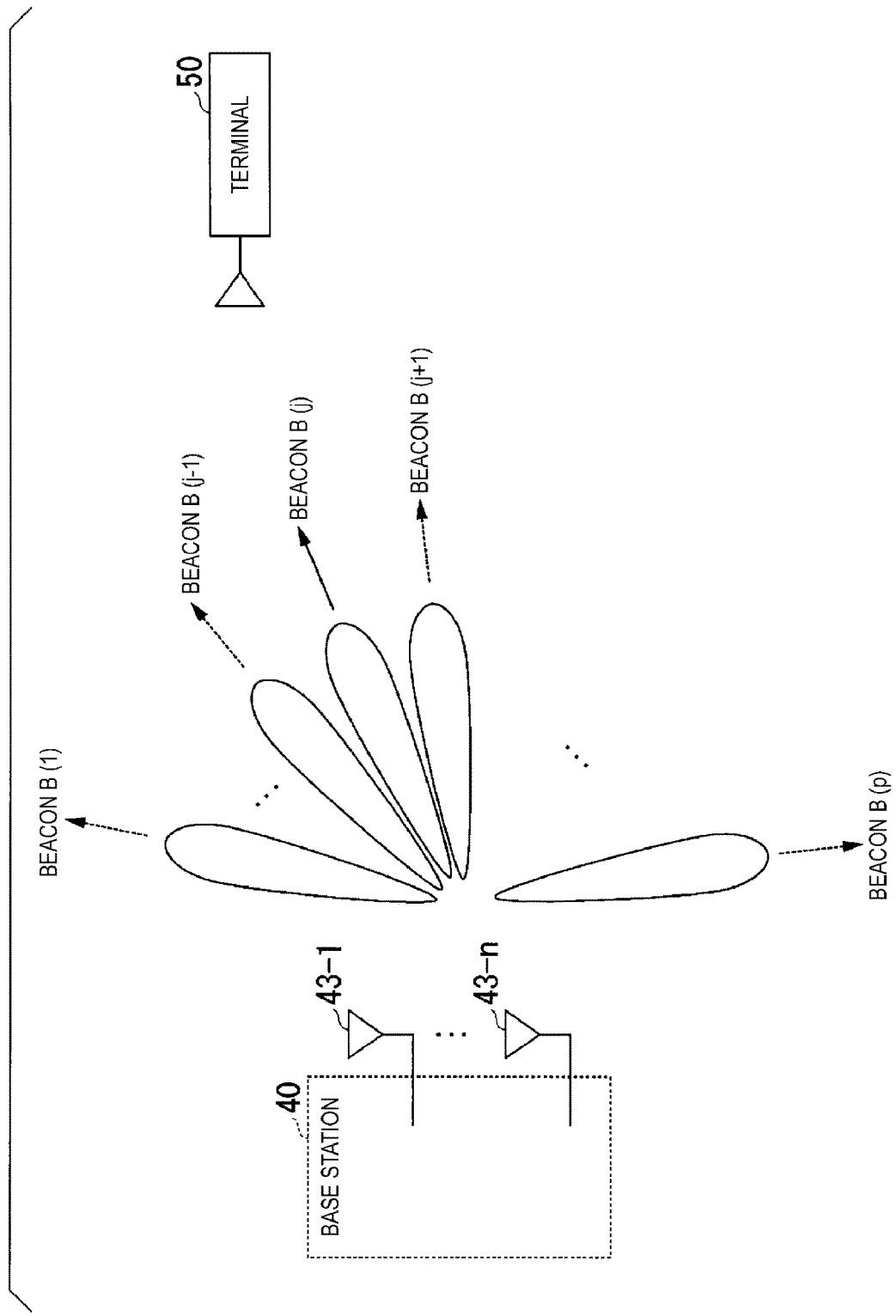
FIG. 5 is a diagram illustrating beacons transmitted by the base station according to the embodiment.

FIG. 5 is a diagram illustrating p beacons B(1), ..., B(p) transmitted from the base station 40 (where p is an integer of 2 or more). The accommodation station 20 generates p beacons B(1), ..., B(p) as RF signals. The accommodation station 20 generates optically modulated beacons B(j) of wavelengths $\lambda_{11}, \ldots, \lambda_{1n}$ through modulation with each beacon B(j) (j=1, ..., p). Before the optically modulated beacons B(1), ..., B(p) are transmitted through the optical fiber, the phase adjustment unit 21 of the accommodation station 20 performs phase adjustment using different values $\alpha_{11}, \ldots, \alpha_{1p}$ as the respective values of $\alpha_1$. That is, the phase adjustment unit 21 of the accommodation station 20 adjusts the phases of optically modulated beacons B(j) of wavelength $\lambda_{1i}$ (i=1, ..., n) generated through modulation with each beacon B(j) (j=1, ..., p) by $(i-1)\alpha_{1j}$.

The optical combiner 22 of the accommodation station 20 wavelength-multiplexes the optically modulated beacons B(j) of wavelengths $\lambda_{11}, \ldots \lambda_{1n}$ which have been phase-adjusted by the phase adjustment unit 21 and transmits the wavelength-multiplexed optically modulated beacon B(j) up to the base station 40 through the optical fiber 30. The optical demultiplexer 41 of the base station 40 demultiplexes the wavelength-multiplexed optical signal transmitted through the optical fiber 30 into the optically modulated beacons B(j) of wavelengths $\lambda_{11}, \ldots, \lambda_{1n}$. The O/E converter 42-$i$ converts an optically modulated beacon B(j) of wavelength $\lambda_{1i}$ from an optical signal into a beacon B(j) of an electrical signal and the antenna element 43-$i$ radiates the optically modulated beacon B(j) of wavelength $\lambda_{1i}$ which has been converted into the electrical signal. Thus, beacons B(j) are radiated from the antenna elements 43-1, ..., 43-$n$. At this time, the beacons B(j) are radiated in a direction $\theta_j$ that satisfies the following equation (3).

[Math. 3]

$$\frac{2\pi}{\lambda_{RF1}} d\sin\theta_j = \alpha_{1j} - \Delta\beta_1 \qquad (3)$$

Performing the above operations for the p beacons B(1), ..., B(p) allows the beacons B(1), ..., B(p) to be transmitted from the base station 40 in p different directions $\theta_1, \ldots, \theta_p$, respectively, as illustrated in FIG. 5.

The terminal 50 receives the p beacons B(1), ..., B(p) radiated from the base station 40, selects a beacon B(j) (j=1, ..., p) with the maximum received power among them, and feeds its beacon number information back to the base station 40. At this time, the terminal 50 transmits the beacon number information q times (q is an integer of 2 or more). Beacon number information is an example of information that uniquely identifies each beacon B(1), ..., B(p). In the following, the beacon number information of the beacon B(j) is referred to as j.

The base station 40 converts the beacon number information fed back from the terminal 50 from electrical signals to optical signals through the E/O converters 44-1, ..., 44-$n$ and wavelength-combines the optical signals through the optical combiner 45 as they are, and then transmits the wavelength-combined optical signal to the accommodation station 20 through the optical fiber 30.

The phase adjustment unit 24 of the accommodation station 20 obtains received powers of q pieces of received beacon number information while performing phase adjustment using different values $\alpha_{21}, \alpha_{2q}$ as the respective values of $\alpha_2$ for the q pieces of received beacon number information. The accommodation station 20 selects $\alpha_{2k}$ (k=1, ..., q) which maximizes the received power from $\alpha_{21}, \ldots, \alpha_{2q}$ and sets it as the value of $\alpha_2$, thereby determining the beam direction of receiving antennas. Further, the accommodation station 20 determines the value of $\alpha_1$ based on the received beacon number information to determine the beam direction of transmitting antennas. That is, if the beacon number information is j, the accommodation station 20 determines that the value of $\alpha_1$ is $\alpha_{1j}$.

Figure 6:
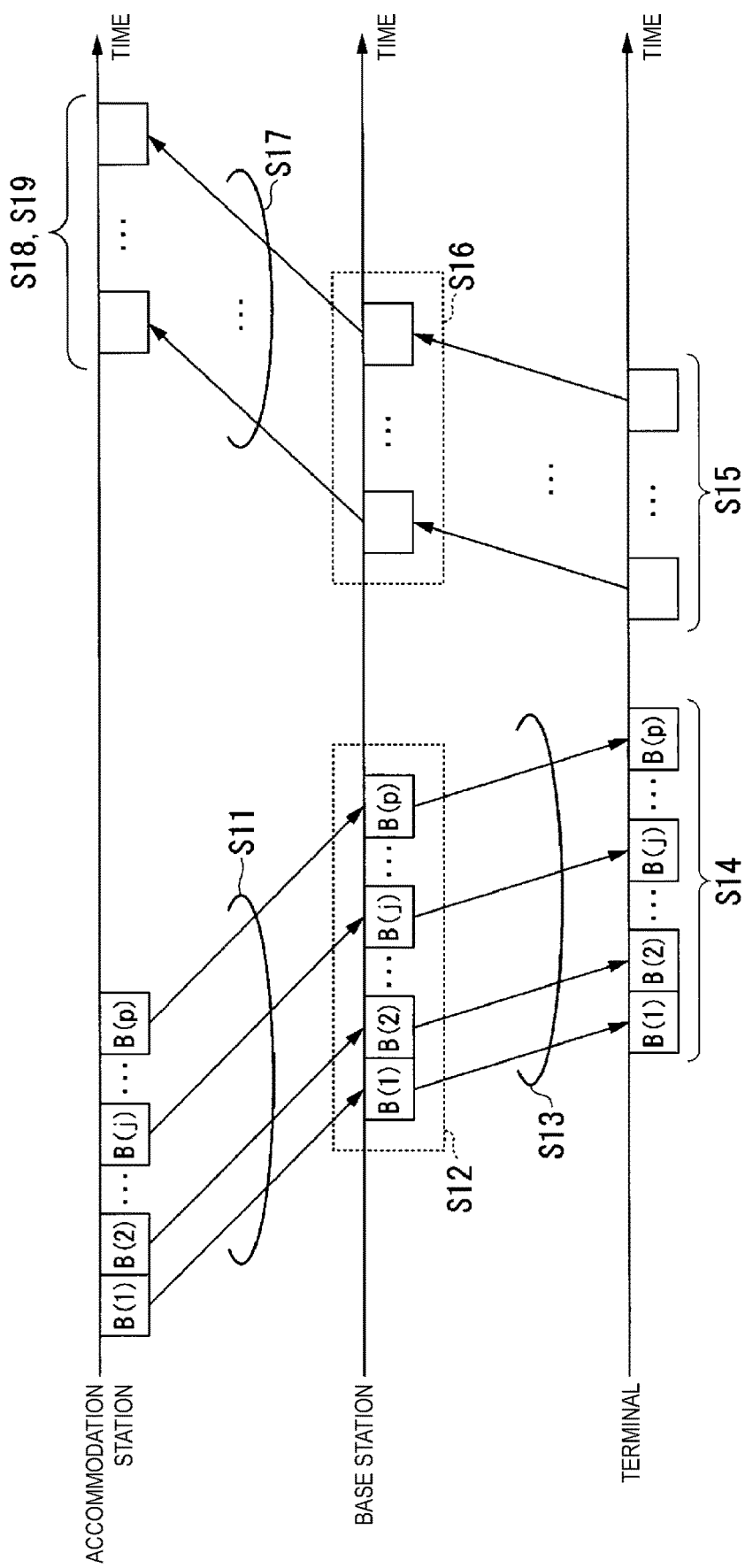
FIG. 6 is a diagram illustrating a process of determining beam directions according to the embodiment.

FIG. 6 is a diagram illustrating a process of determining beam directions in the wireless communication system 10. FIG. 6 illustrates the above operations of the accommodation station 20, the base station 40, and the terminal 50 on the same time axis. The accommodation station 20 generates optically modulated beacons B(1), ..., B(p) which have been phase-adjusted respectively using $\alpha_{11}, \ldots, \alpha_{1p}$ as $\alpha_1$ and transmits them to the base station 40 (step S11). The base station 40 O/E converts optically modulated received beacons B(1), ..., B(p) into RF signals (step S12) and transmits the beacons B(1), ..., B(p) which have been converted into RF signals at different timings (step S13).

The terminal 50 receives the beacons B(1), ..., B(p) and selects a beacon B(j) (j=1, ..., p) having the maximum received power among them (step S14). The terminal 50 transmits beacon number information that identifies the selected beacon B(j) to the base station 40 q times (step S15). The base station 40 E/O converts q pieces of received beacon number information (step S16) and transmits them to the accommodation station 20 (step S17). The accommodation station 20 receives the q pieces of beacon number information while scanning the values of $\alpha_2$ in the order of $\alpha_{21}, \ldots, \alpha_{2q}$, selects a value of $\alpha_{2k}$ (k=1, ..., q) which maximizes the received power, and determines that the selected value is the value of $\alpha_2$. This enables the accommodation station 20 to determine the reception beam direction (step S18). Further, the accommodation station 20 determines that the value of $\alpha_1$ is $\alpha_{1j}$ that was used when the beacon B(j) indicated by the received beacon number information j was transmitted. This enables the accommodation station 20 to determine the transmission beam direction (step S19).

The base station 40 only performs O/E and E/O conversion of signals received from the accommodation station 20 and the terminal 50, and basically does not need to perform any phase adjustment control.

3. Configuration of Apparatuses

The configuration of each apparatus used in the wireless communication system 10 of the present embodiment will be described.

3.1 Configuration of Accommodation Station

Figure 7:
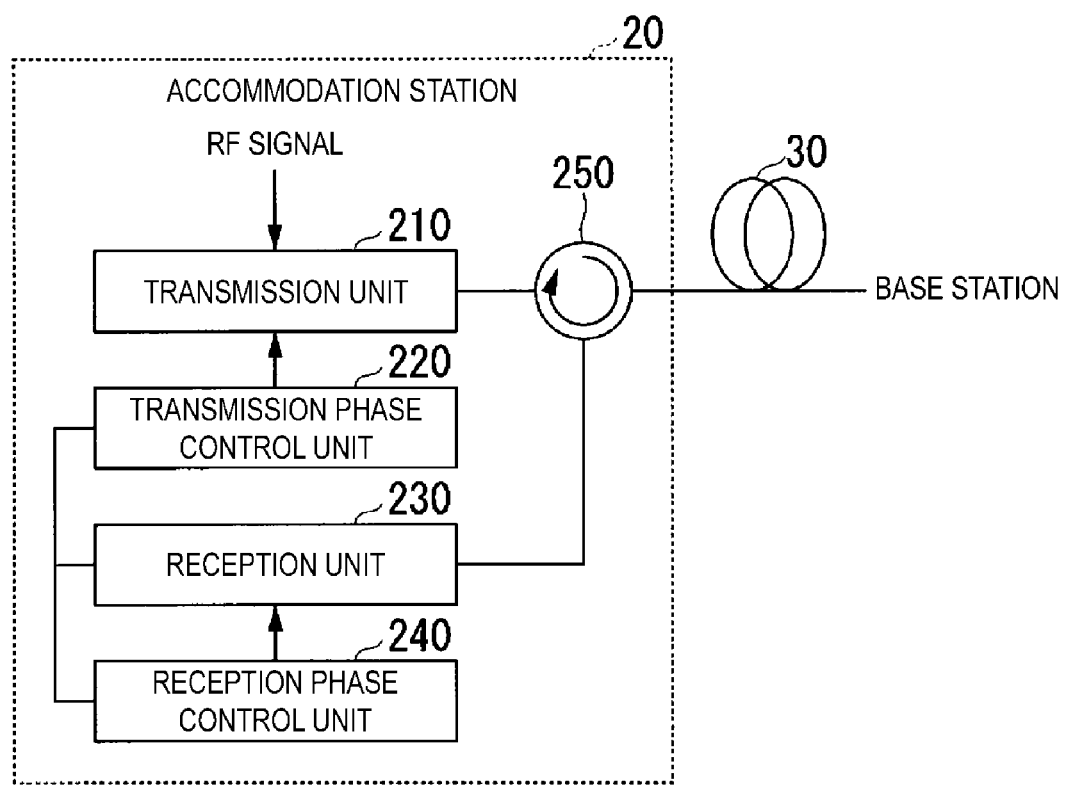
FIG. 7 is a block diagram illustrating a configuration of an accommodation station according to the embodiment.

FIG. 7 is a block diagram illustrating the configuration of the accommodation station 20, where only functional blocks relating to the present embodiment are extracted and illustrated. The accommodation station 20 includes a transmission unit 210, a transmission phase control unit 220, a reception unit 230, a reception phase control unit 240, and an optical circulator 250.

The transmission unit 210 generates optically modulated transmission signals of wavelengths $\lambda_{11}, \ldots, \lambda_{1n}$. For phase adjustment of the optically modulated transmission signals, the transmission unit 210 adjusts the phases of optically modulated signals into which light of the wavelengths is modulated with an RF signal. In this case, a first transmission unit 211 illustrated in FIG. 8 which will be described later can be used as the transmission unit 210. Alternatively, for phase adjustment of the optically modulated transmission signals, the transmission unit 210 adjusts the phases of RF signals into which an RF signal is split for use in modulation of light of the wavelengths and then modulates light of the wavelengths with the phase-adjusted RF signals. In this case, a second transmission unit 212 illustrated in FIG. 9 which will be described later can be used as the transmission unit 210. The transmission phase control unit 220 instructs the transmission unit 210 with the magnitudes of phase adjustment.

The reception unit 230 adjusts the phases of optically modulated received signals of wavelengths $\lambda_{21}, \ldots, \lambda_{2n}$ and obtains demodulated signals. For phase adjustment of the optically modulated received signals, the reception unit 230 adjusts the phases of demultiplexed optically modulated signals. In this case, a first reception unit 231 illustrated in FIG. 10 which will be described later can be used as the reception unit 230. Alternatively, for phase adjustment of the optically modulated received signals, the reception unit 230 adjusts the phases of RF signals obtained through O/E conversion of the demultiplexed optically modulated signals. In this case, a second reception unit 232 illustrated in FIG. 11 which will be described later can be used as the reception unit 230. The reception phase control unit 240 instructs the reception unit 230 with the magnitudes of phase adjustment.

The optical circulator 250 receives as an input an optically modulated transmission signal output by the transmission unit 210 and outputs it to the optical fiber 30 and receives as an input an optically modulated received signal transmitted through the optical fiber 30 and outputs it to the reception unit 230.

Figure 8:
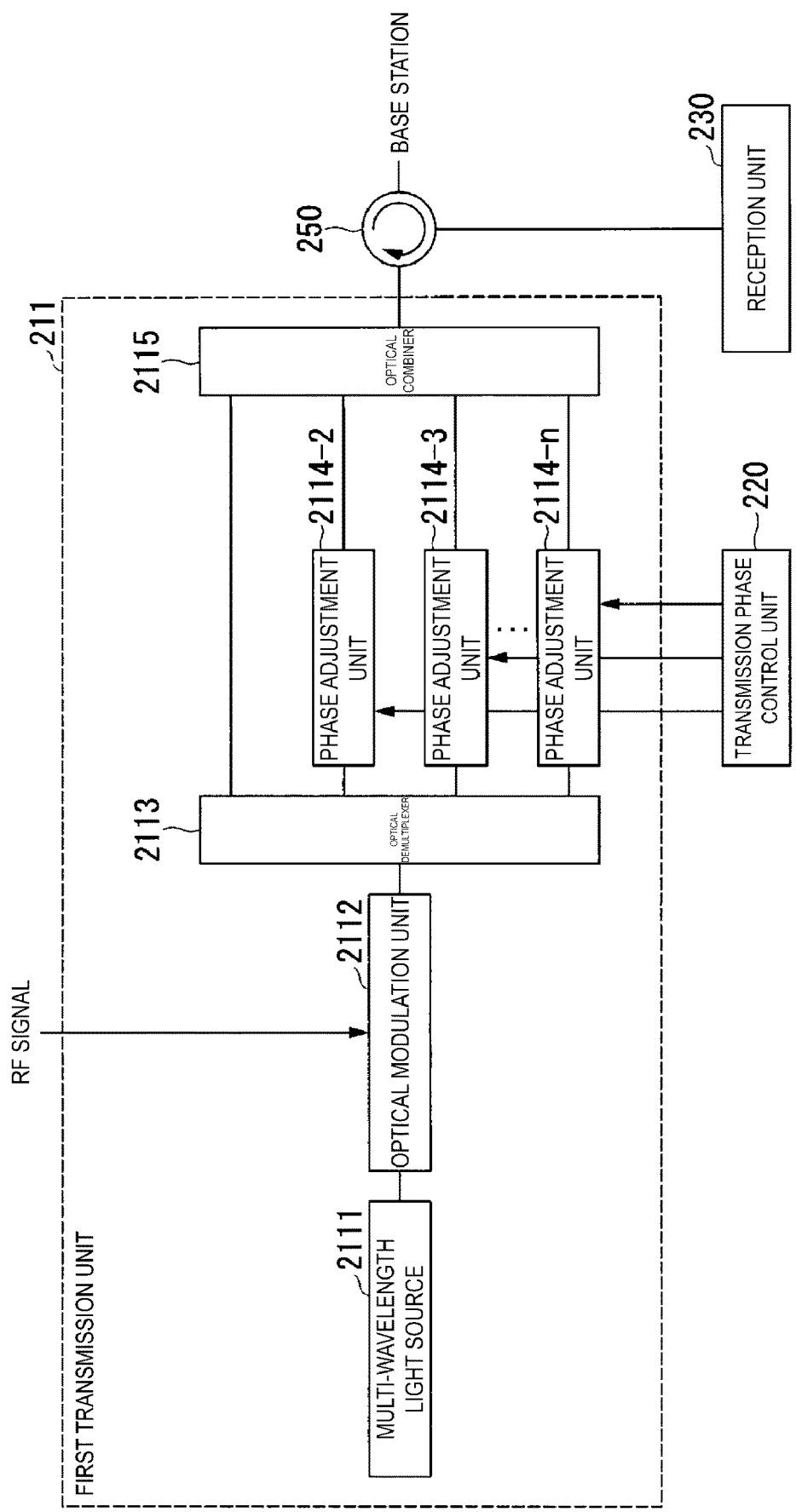
FIG. 8 is a block diagram illustrating a configuration of a first transmission unit according to the embodiment.

FIG. 8 is a block diagram illustrating the configuration of the first transmission unit 211. The first transmission unit 211 includes a multi-wavelength light source 2111, an optical modulation unit 2112, an optical demultiplexer 2113, phase adjustment units 2114-2, . . . , 2114-n, and an optical combiner 2115. The multi-wavelength light source 2111 outputs light of wavelengths $\lambda_{11}, \ldots, \lambda_{1n}$. The optical modulation unit 2112 modulates the light of wavelengths $\lambda_{11}, \ldots, \lambda_{1n}$ output by the multi-wavelength light source 2111 with an RF signal. The optical demultiplexer 2113 splits optically modulated signals of wavelengths $\lambda_{11}, \ldots, \lambda_{1n}$. The phase adjustment units 2114-2, . . . , 2114-n correspond to the phase adjustment unit 21 in FIG. 2. Each phase adjustment unit 2114-i (i=2, . . . , n) adjusts the phase of an optically modulated signal of wavelength $\lambda_{1i}$ under the control of the transmission phase control unit 220 and then outputs the phase-adjusted optically modulated signal to the optical combiner 2115. The optical combiner 2115 corresponds to the optical combiner 22 in FIG. 2. The optical combiner 2115 combines the optically modulated signal of $\lambda_{11}$ output by the optical demultiplexer 2113 and the optically modulated signals of $\lambda_{12}, \ldots, \lambda_{1n}$ output by the phase adjustment units 2114-2, . . . , 2114-n and outputs the combined optically modulated signal to the optical circulator 250. The optical circulator 250 outputs the combined optically modulated signal to the optical fiber 30.

Figure 9:
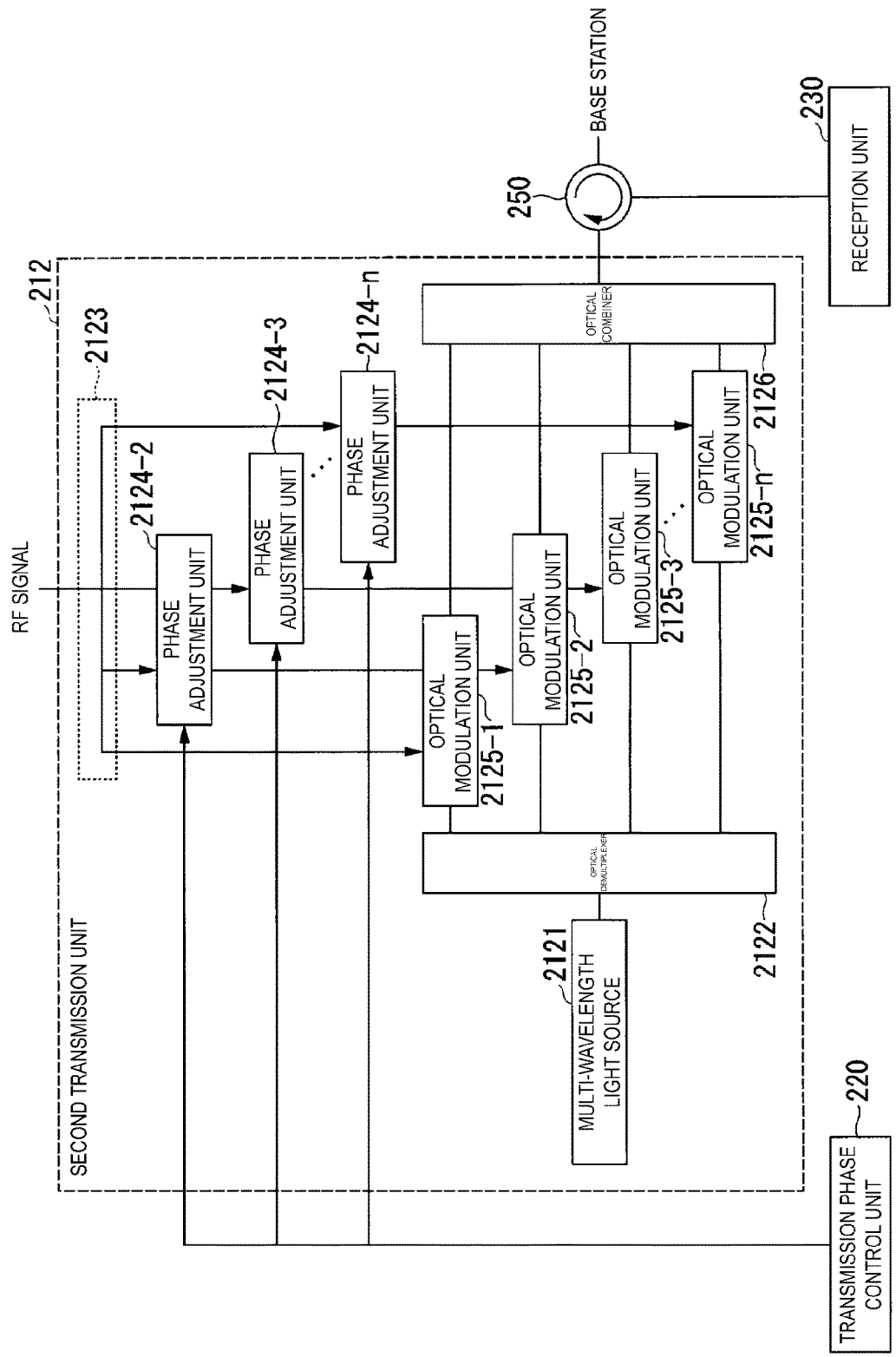
FIG. 9 is a block diagram illustrating a configuration of a second transmission unit according to the embodiment.

FIG. 9 is a block diagram illustrating the configuration of the second transmission unit 212. The second transmission unit 212 includes a multi-wavelength light source 2121, an optical demultiplexer 2122, a splitting unit 2123, phase adjustment units 2124-2, . . . , 2124-n, optical modulation units 2125-1, . . . , 2125-n, and an optical combiner 2126. The multi-wavelength light source 2121 outputs light of wavelengths $\lambda_{11}, \ldots, \lambda_{1n}$. The optical demultiplexer 2122 splits optically modulated signals of wavelengths $\lambda_{11}, \ldots, \lambda_{1n}$. The splitting unit 2123 splits an RF signal into n RF signals and outputs the RF signals to the optical modulation unit 2125-1 and the phase adjustment units 2124-2, . . . , 2124-n. The phase adjustment units 2124-2, . . . , 2124-n correspond to the phase adjustment unit 21 in FIG. 2. Each phase adjustment unit 2124-i (i=2, . . . , n) adjusts the phase of an RF signal under the control of the transmission phase control unit 220 and then outputs the phase-adjusted RF signal to an optical modulation unit 2125-i. The optical modulation unit 2125-1 modulates light of wavelength $\lambda_{11}$ demultiplexed by the optical demultiplexer 2122 with an RF signal and outputs the modulated light to the optical combiner 2126. Each optical modulation unit 2125-i (i=2, . . . , n) modulates light of wavelength $\lambda_{1i}$ demultiplexed by the optical demultiplexer 2122 with an RF signal which has been phase-adjusted by the phase adjustment unit 2124-i and outputs the modulated light to the optical combiner 2126. The optical combiner 2126 corresponds to the optical combiner 22 in FIG. 2. The optical combiner 2126 combines the optically modulated signals of $\lambda_{11}, \ldots, \lambda_{1n}$ output by the optical modulation units 2125-1, . . . , 2125-n and outputs the combined optically modulated signal to the optical circulator 250. The optical circulator 250 outputs the combined optically modulated signal to the optical fiber 30.

Figure 10:
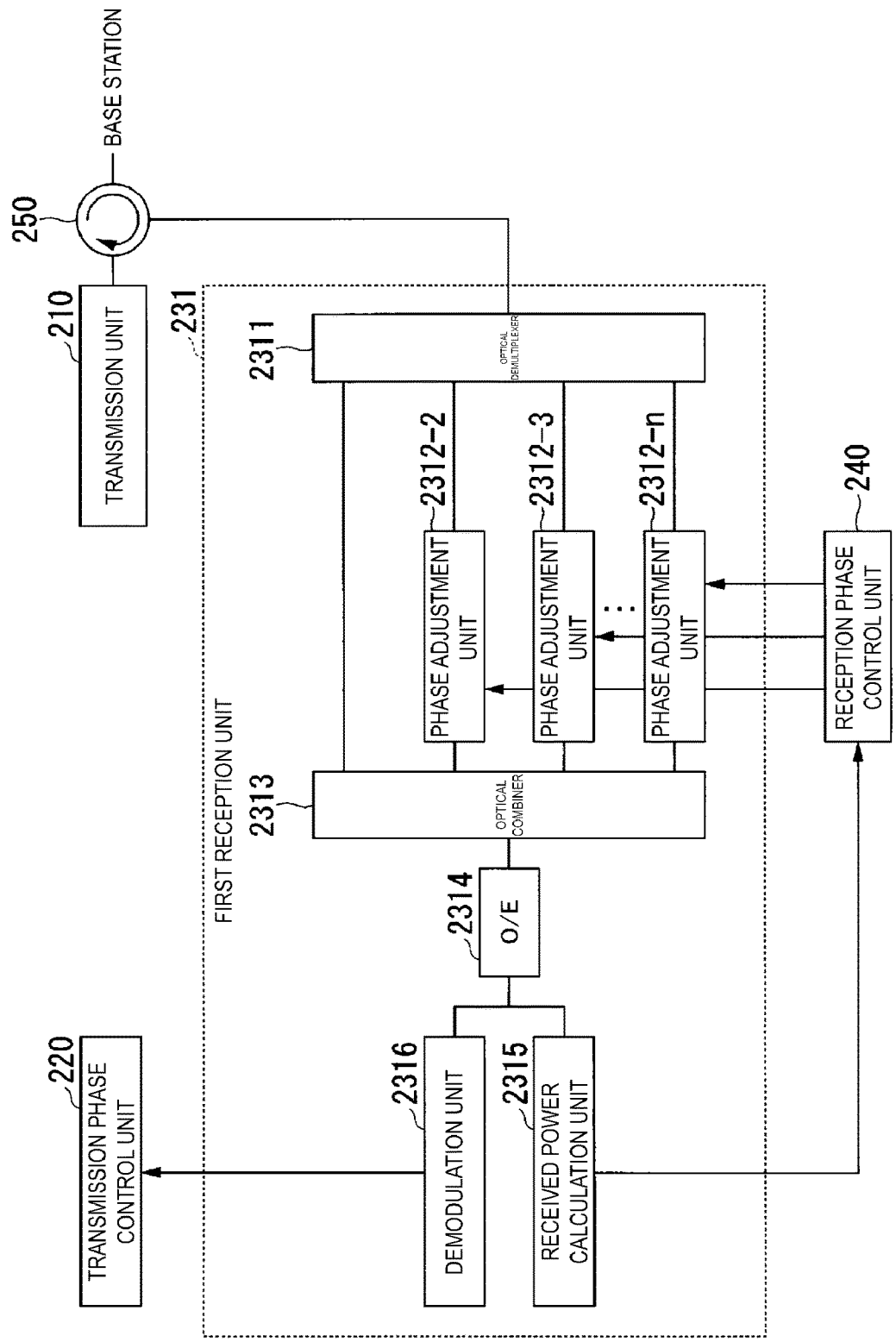
FIG. 10 is a block diagram illustrating a configuration of a first reception unit according to the embodiment.

FIG. 10 is a block diagram illustrating the configuration of the first reception unit 231. The first reception unit 231 includes an optical demultiplexer 2311, phase adjustment units 2312-2, . . . , 2312-n, an optical combiner 2313, an O/E converter 2314, a received power calculation unit 2315, and a demodulation unit 2316. The optical demultiplexer 2311 receives an optically modulated received signal output from the base station 40 through the optical circulator 250 and splits it into optically modulated signals of wavelengths $\lambda_{22}, \ldots, \lambda_{2n}$. The phase adjustment units 2312-2, . . . , 2312-n correspond to the phase adjustment unit 24 in FIG. 4. Each phase adjustment unit 2312-i (i=2, . . . , n) adjusts the phase of an optically modulated signal of wavelength $\lambda_{2i}$ under the control of the reception phase control unit 240 and then outputs the phase-adjusted optically modulated signal to the optical combiner 2313. The optical combiner 2313 combines an optically modulated signal of wavelength $\lambda_{21}$ output by the optical demultiplexer 2311 and optically modulated signals of wavelengths $\lambda_{22}, \ldots, \lambda_{2n}$ output by the phase adjustment units 2312-2, . . . , 2312-$n$ and outputs the combined optically modulated signals to the O/E converter 2314. The O/E converter 2314 outputs the optically modulated signals combined by the optical combiner 2313 as electrical signals and outputs the electrical signals to the received power calculation unit 2315 and the demodulation unit 2316. The received power calculation unit 2315 calculates the received powers of the electrical signals input from the O/E converter 2314 and outputs the calculation result to the reception phase control unit 240. The demodulation unit 2316 demodulates received signals which have been converted into the electrical signals. Upon obtaining beacon number information transmitted by the terminal 50 through demodulation, the demodulation unit 2316 outputs the obtained beacon number information to the transmission phase control unit 220.

Figure 11:
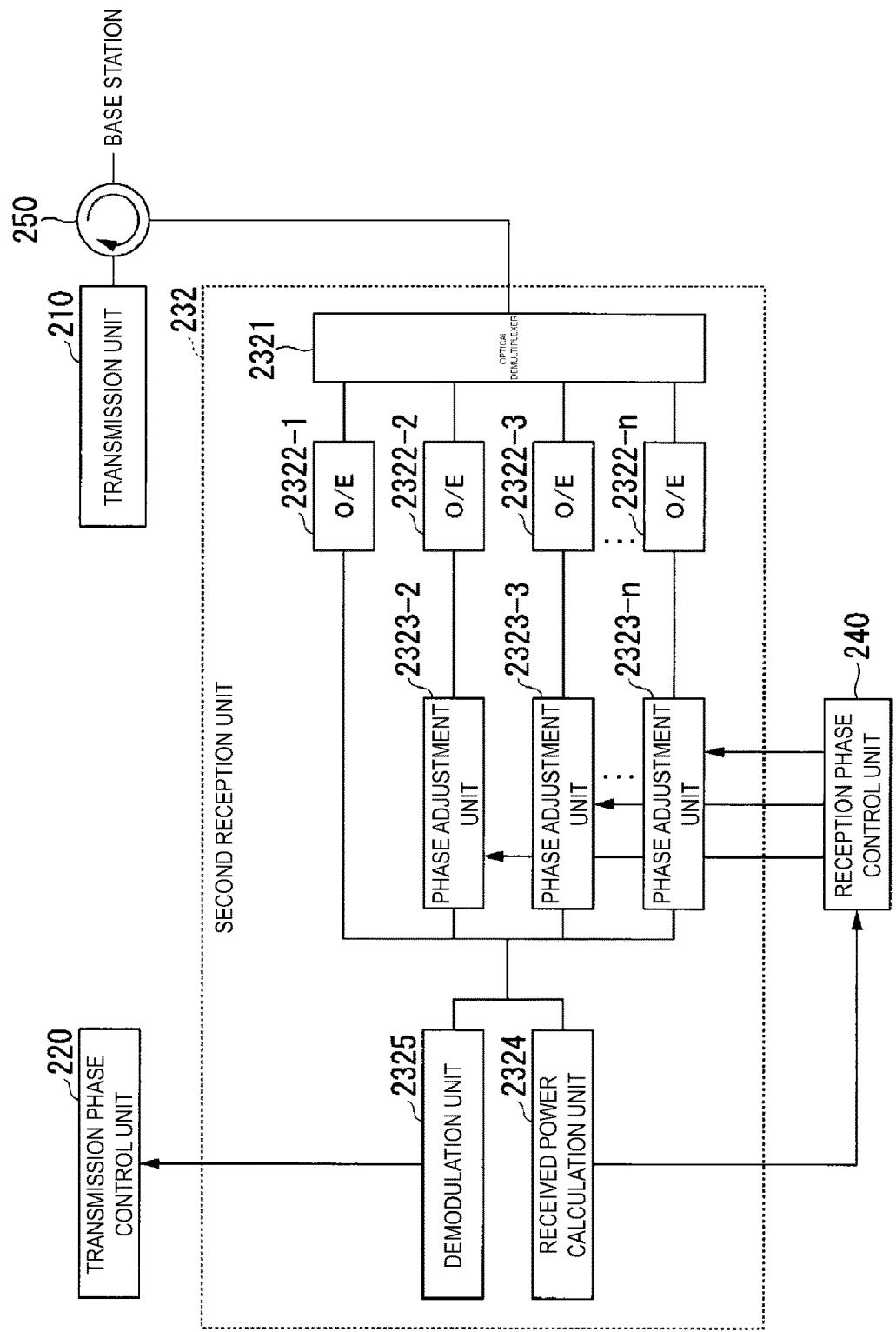
FIG. 11 is a block diagram illustrating a configuration of a second reception unit according to the embodiment.

FIG. 11 is a block diagram illustrating the configuration of the second reception unit 232. The second reception unit 232 includes an optical demultiplexer 2321, O/E converters 2322-1, . . . , 2322-$n$, phase adjustment units 2323-2, . . . , 2323-$n$, a received power calculation unit 2324, and a demodulation unit 2325.

The optical demultiplexer 2321 receives an optically modulated received signal output by the base station 40 through the optical circulator 250 and splits it into optically modulated signals of wavelengths $\lambda_{22}, \ldots, \lambda_{2n}$. Each O/E converter 2322-$i$ (i=1, . . . , n) converts an optically modulated signal of wavelength $\lambda_{2i}$ demultiplexed by the optical demultiplexer 2321 into an electrical signal. Each phase adjustment unit 2323-$i$ (i=2, . . . , n) adjusts the phase of the electrical signal output by the O/E converter 2322-$i$ under the control of the reception phase control unit 240. The received power calculation unit 2324 calculates a received power using an electrical signal output by the O/E converter 2322-1 and electrical signals output by the phase adjustment units 2323-2, . . . , 2323-$n$ and outputs the calculation result to the reception phase control unit 240. The demodulation unit 2325 demodulates a signal transmitted from the terminal 50 using the electrical signal output by the O/E converter 2322-1 and the electrical signals output by the phase adjustment units 2323-2, . . . , 2323-$n$. Upon obtaining beacon number information transmitted by the terminal 50 through demodulation, the demodulation unit 2325 outputs the obtained beacon number information to the transmission phase control unit 220.

3.2 Configuration of Base Station

Figure 12:
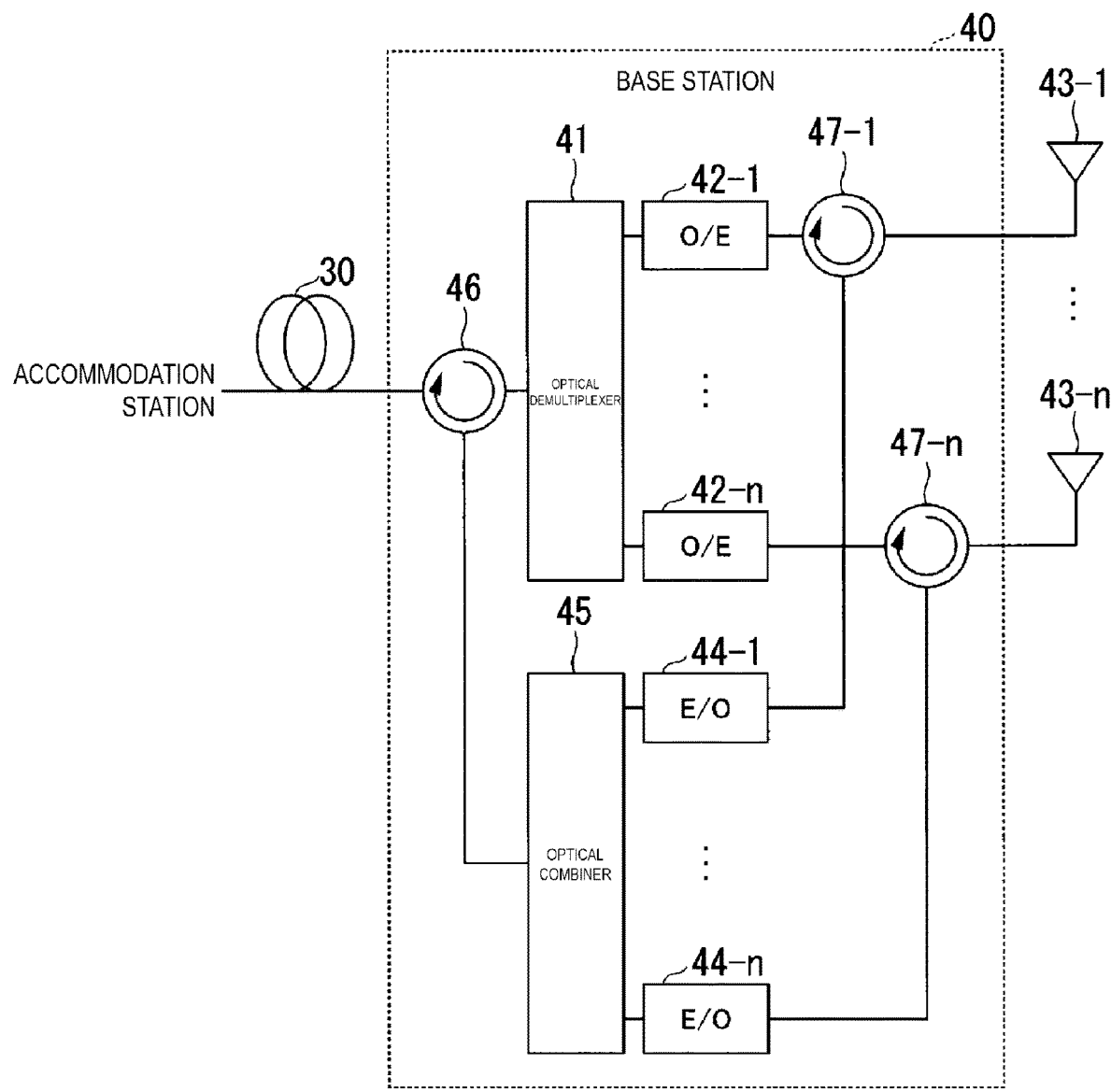
FIG. 12 is a block diagram illustrating a configuration of the base station according to the embodiment.

FIG. 12 is a block diagram illustrating the configuration of the base station 40, where only functional blocks relating to the present embodiment are extracted and illustrated. The base station 40 includes an optical demultiplexer 41, O/E converters 42-1, . . . , 42-$n$, antenna elements 43-1, . . . , 43-$n$, E/O converters 44-1, . . . , 44-$n$, an optical combiner 45, an optical circulator 46, and electrical circulators 47-1, . . . , 47-$n$.

The optical demultiplexer 41 splits optically modulated signals of wavelengths $\lambda_{11}, \ldots, \lambda_{1n}$ transmitted through the optical fiber 30 and outputs the split optically modulated signals of wavelength $\lambda_{1i}$ (i=1, . . . , n) to the O/E converters 42-$i$. Each O/E converter 42-$i$ (i=1, . . . , n) converts an optically modulated signal of wavelength $\lambda_{1i}$ into an RF signal and outputs the RF signal to the antenna element 43-$i$. The antenna element 43-$i$ (i=1, . . . , n) radiates the RF signal output by the OLE converter 42-$i$. The antenna element 43-$i$ (i=1, . . . , n) also outputs a wirelessly received RF signal to the E/O converter 44-$i$. The E/O converter 44-$i$ (i=1, . . . , n) modulates light of wavelength $\lambda_{2i}$ using the RF signal received by the antenna element 43-$i$ to convert the RF signal into an optical signal and outputs the optical signal to the optical combiner 45. The optical combiner 45 outputs an optically modulated received signal obtained by combining the optically modulated signals of wavelengths $\lambda_{21}, \ldots, \lambda_{2n}$ output from the E/O converters 44-1, . . . , 44-$n$.

The optical circulator 46 receives as an input an optically modulated transmission signal transmitted through the optical fiber 30 and outputs it to the optical demultiplexer 41. The optical circulator 46 also receives as an input a combined optically modulated received signal obtained by the optical combiner 45 and outputs it to the optical fiber 30. The electrical circulator 47-$i$ (i=1, . . . , n) receives as an input an RF signal output by the O/E converter 42-$i$ and outputs it to the antenna element 43-$i$. The electrical circulator 47-$i$ (i=1, . . . , n) also receives as an input an RF signal received by the antenna element 43-$i$ and outputs it to the E/O converter 44-$i$.

3.3 Configuration of Terminal

Figure 13:
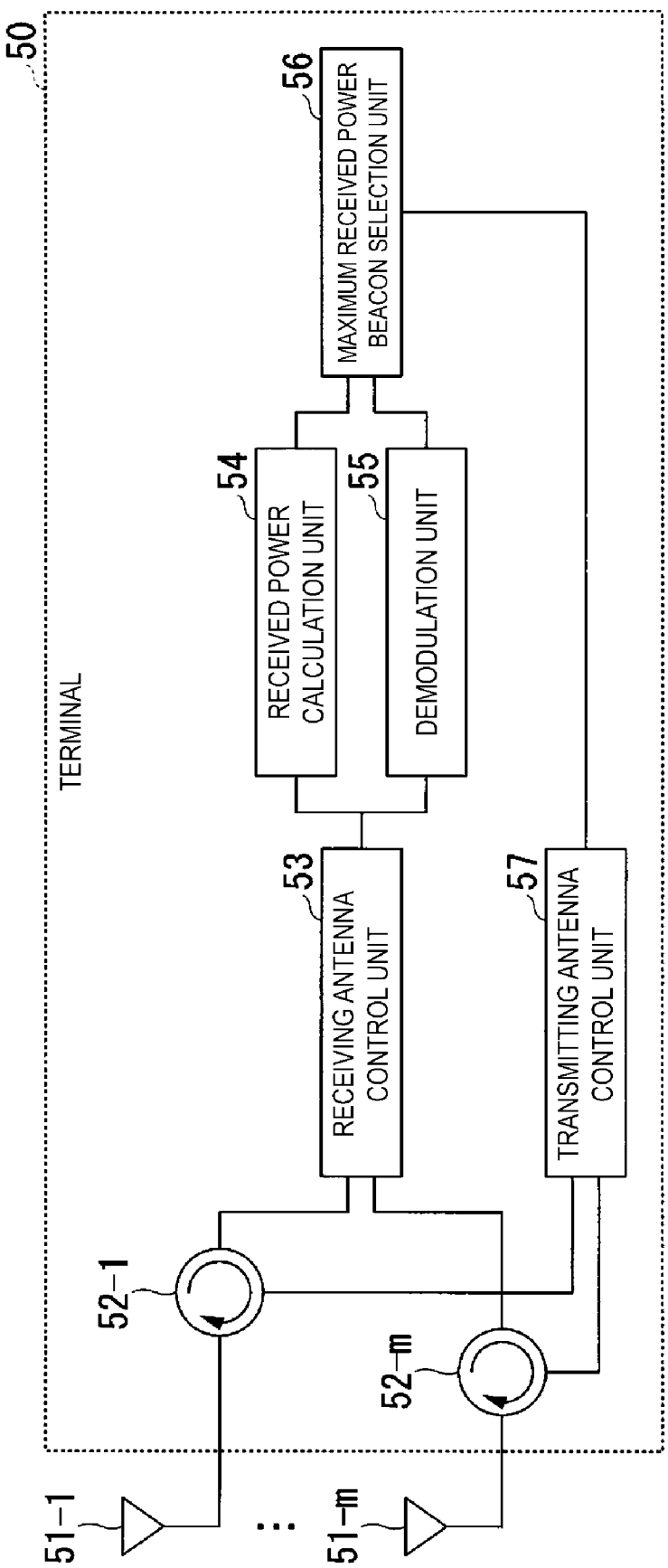
FIG. 13 is a block diagram illustrating a configuration of a terminal according to the embodiment.

FIG. 13 is a block diagram illustrating the configuration of the terminal 50, where only functional blocks relating to the present embodiment are extracted and illustrated. The terminal 50 includes antenna elements 51-1, . . . , 51-$m$ (m is an integer of 1 or more), electrical circulators 52-1, . . . , 52-$m$, a receiving antenna control unit 53, a received power calculation unit 54, a demodulation unit 55, a maximum received power beacon selection unit 56, and a transmitting antenna control unit 57.

The antenna elements 51-1, . . . , 51-$m$ output wirelessly received RF signals to the receiving antenna control unit 53. The antenna elements 51-1, . . . , 51-$m$ also radiate RF signals output by the transmitting antenna control unit 57. Each electrical circulator 52-$i$ (i=1, . . . , m) receives as an input an RF signal received by the antenna element 51-$i$ and outputs it to the receiving antenna control unit 53 and receives as an input an RF signal output by the transmitting antenna control unit 57 and outputs it to the antenna element 51-$i$. The receiving antenna control unit 53 has a function of controlling beamforming of the receiving antennas of the terminal 50 and the like. The received power calculation unit 54 calculates received powers of received beacons and outputs the calculation result to the maximum received power beacon selection unit 56. The demodulation unit 55 demodulates received signals. Upon demodulating beacons, the demodulation unit 55 outputs beacon number information obtained from information contained in the beacons to the maximum received power beacon selection unit 56. The maximum received power beacon selection unit 56 acquires beacon number information of a beacon having the maximum received power based on the received powers calculated by the received power calculation unit 54 and outputs the beacon number information to the transmitting antenna control unit 57. The transmitting antenna control unit 57 performs control such that RF signals in which the beacon number information is set are transmitted p times through the antenna elements 51-1, . . . , 51-$m$. The transmitting antenna control unit 57 also has a function of controlling beamforming of the transmitting antennas of the terminal 50 and the like.

4. Operation of Wireless Communication System

Next, the operation of the wireless communication system 10 will be described.

4.1 When First Transmission Unit and First Reception Unit are Used (Operation Example 1)

In operation example 1, the first transmission unit 211 illustrated in FIG. 8 and the first reception unit 231 illustrated in FIG. 10 are used as the transmission unit 210 and the reception unit 230 of the accommodation station 20. The accommodation station 20 adjusts the phases of optically modulated signals of wavelengths for phase adjustment of optically modulated transmission signals and optically modulated received signals.

4.1.1 Beamforming of Transmitting Antennas

The multi-wavelength light source 2111 of the accommodation station 20 generates optical signals of n different wavelengths $\lambda_{11}, \ldots, \lambda_{1n}$. Here, the wavelengths $\lambda_{11}, \ldots, \lambda_{1n}$ are assumed to be arranged at equal intervals which are sufficiently small wavelength intervals. That is, $\lambda_{1i}=\lambda_{11}+(i-1)\Delta\lambda_1$ is assumed to hold for a sufficiently small wavelength interval $\Delta\lambda_1$. The optical signals of wavelengths $\lambda_{11}, \ldots, \lambda_{1n}$ are input to the single optical modulation unit 2112. The optical modulation unit 2112 modulates the optical signals of wavelengths $\lambda_{11}, \ldots, \lambda_{1n}$ input from the multi-wavelength light source 2111 using an input RF signal and outputs optically modulated signals of wavelengths $\lambda_{11}, \ldots, \lambda_{1n}$.

Generally, a signal obtained by modulating an optical signal with an RF signal is a double side band (DSB) signal.

When such a DSB signal is transmitted through an optical fiber, a delay difference occurs between its lower and upper sidebands under the influence of chromatic dispersion, so that fading occurs. This limits the length of an optical fiber which enables transmission. The higher the frequency of an RF signal, the greater the interval between the sidebands and therefore the more significant the effect of fading. In order to avoid such fading due to chromatic dispersion, the optical modulation unit 2112 may have a function of handling fading due to chromatic dispersion, such as using single side band (SSB) signals or two-tone signals as optically modulated signals.

The optical demultiplexer 2113 fixedly splits the optically modulated signals of wavelengths $\lambda_{11}, \ldots, \lambda_{1n}$. The optically modulated signal of wavelength $\lambda_{11}$ is sent to the optical combiner 2115 as it is, and the optically modulated signals of wavelengths $\lambda 12, \ldots, \lambda_{1n}$ are sent to the phase adjustment units 2114-2, ..., 2114-n, respectively. At this time, it is unnecessary to control the optical demultiplexer 2113 because the optical splitting is fixed.

The transmission phase control unit 220 inputs values of $\alpha_1$ to the n-1 phase adjustment units 2114-2, ..., 2114-n. The amounts of phase adjustment of RF signals of the optically modulated signals of wavelengths $\lambda_{11}, \lambda_{12}, \lambda_{13}, \ldots, \lambda_{1n}$ are 0, $\alpha_1$, $2\alpha_1$, ..., $(n-1)\alpha_1$, respectively, which are at $\alpha_1$ intervals. That is, the phase of the RF signal of the optically modulated signal of each wavelength $\lambda_{1i}$ (i=1, ..., n) can be adjusted by $(i-1)\alpha_1$. When the amount of phase adjustment $\alpha_1$ of the optically modulated signal of wavelength $\lambda_{12}$ is determined, the amounts of phase adjustment of the optically modulated signals of wavelengths $\lambda_{13}, \ldots, \lambda_{1n}$ are automatically determined. That is, the phase adjustment unit 2114-i (i=2, ..., n) adjusts the phase of the RF signal of an input optically modulated signal of wavelength $\lambda_{11}$ by $(i-1)\alpha_1$ and outputs the phase-adjusted optically modulated signal to the optical combiner 2115.

The optical combiner 2115 combines the optically modulated signal of wavelength $\lambda_{11}$ and the phase-adjusted optically modulated signals of wavelengths $\lambda_{12}, \ldots, \lambda_{1n}$. The combined optically modulated signal is sent to the base station 40 via the optical circulator 250 and the optical fiber 30. At this time, it is unnecessary to know distance information of the optical fiber 30.

When optically modulated signals of wavelengths $\lambda_{11}, \ldots, \lambda_{1n}$ are transmitted through an optical fiber, they undergo different delay differences under the influence of chromatic dispersion and thus experience different phase rotations. Because the wavelengths $\lambda_{11}, \ldots, \lambda_{1n}$ are arranged at equal intervals which are sufficiently small wavelength intervals, the delay differences due to chromatic dispersion can also be made at equal intervals and the amounts of phase rotation of the RF signals of the optically modulated signals of wavelengths $\lambda_{11}, \ldots, \lambda_{1n}$ are also at equal intervals. That is, the amounts of phase rotation $\beta_{11}, \ldots, \beta_{1n}$ of the RF signals of the optically modulated signals of wavelengths $\lambda_{11}, \ldots, \lambda_{1n}$ are $\beta_{11}$, $\beta_{11}-\Delta\beta_1$, $\beta_{11}-2\Delta\beta_1, \ldots, \beta_{11}-(n-1)\Delta\beta_1$, respectively, and can be expressed as $\beta_{1i}=\beta_{11}-(i-1)\Delta\beta_1$. The amounts of phase rotation $\beta_{11}, \ldots, \beta_{1n}$ of the RF signals are constants because the wavelengths $\lambda_{11}, \ldots, \lambda_{1n}$ are fixed. However, the values of the amounts of phase rotation $\beta_{11}, \ldots, \beta_{1n}$ of the RF signals cannot be specifically obtained if the distance information of the optical fiber 30 is unknown.

The optically modulated signals of wavelengths $\lambda_{11}, \ldots, \lambda_{1n}$ which have been transmitted from the accommodation station 20 to the base station 40 through the optical fiber are fixedly split by the optical demultiplexer 41 after passing through the optical circulator 46 and are sent to the antenna elements 43-1, ..., 43-n. At this time, it is unnecessary to control the optical demultiplexer 41 because the optical splitting is fixed.

The O/E converters 42-1, ..., 42-n convert the optically modulated signals of wavelengths $\lambda_{11}, \ldots, \lambda_{1n}$ into RF signals through O/E conversion, respectively. The RF signal of the optically modulated signal of wavelength is phase-adjusted by $(i-1)\alpha_1$ at the accommodation station 20 and further experiences a phase rotation of $\beta_{1i}=\beta_{11}-(i-1)\Delta\beta_1$ during transmission through the optical fiber. The phase $\phi_{1i}$ of the wavelength $\lambda_{1i}$ is arranged such that $\pi_{1i}=(i-1)\alpha_1+\beta_{1i}=\beta_{11}+(i-1)(\alpha_1-\Delta\beta_1)$, and an RF signal with the phase $\phi_{1i}$ is radiated from the antenna element 43-i.

The phase difference between transmitted RF signals radiated from adjacent antenna elements 43-(i+1) and 43-i is $\phi_{1(i+1)}-\phi_{1i}=\alpha_1-\Delta\beta_1$, so that the phase difference between adjacent antenna elements is constant at $\alpha_1-\Delta\beta_1$. When the wavelength of the transmitted RF signal is $2_{RF1}$ and the transmission beam direction θ is defined as illustrated in FIG. 3 assuming that the antenna elements 43-1, ..., 43-n are arranged at equal intervals d, a transmission beam is formed in a direction satisfying the above equation (1).

The wavelength $\lambda_{RF1}$ of the transmitted RF signal and the antenna element interval d are known constants. Because the wavelengths $\lambda_{11}, \ldots, \lambda_{1n}$ are fixed, $\Delta\beta_1$ is also a constant. However, if the distance information of the optical fiber 30 is unknown, the values of the amounts of phase rotation $\beta_{11}, \ldots, \beta_{1n}$ of the RF signals cannot be specifically obtained and a specific value of $\Delta\beta_1$ cannot be obtained. Thus, $\alpha_1$ alone determines the transmission beam direction θ. This means that a transmission beam can be formed in a certain direction θ by changing the value of $\alpha_1$, while the specific direction is unknown. However, basically, there is no need to control the base station 40 in forming the transmission beam because the accommodation station 20 alone controls $\alpha_1$.

If the distance information of the optical fiber 30 is unknown, the direction θ of the transmission beam formed by the base station 40 is unknown as described above. Thus, feedback from the terminal 50, which is a communication partner of the base station 40, is required to determine the transmission beam direction. A process of determining the transmission beam direction will be described in detail after beamforming of the receiving antennas is described.

4.1.2 Beamforming of Receiving Antennas

When the n antenna elements 43-1, ..., 43-n of the base station 40 receive RF signals from the terminal 50, the received RF signals are sent to the E/O converters 44-1, ..., 44-n via the electrical circulators 47-1, ..., 47-n. The E/O converters 44-1, ..., 44-n corresponding to the antenna elements 43-1, ..., 43-n modulate optical signals of wavelengths $\lambda_{21}, ..., \lambda_{2n}$ with the received RF signals and output optically modulated signals of wavelengths $\lambda_{21}, ..., \lambda_{2n}$. Here, the wavelengths $\lambda_{21}, ..., \lambda_{2n}$ are assumed to be arranged at equal intervals which are sufficiently small wavelength intervals. That is, $\lambda_{2i}=\lambda_{21}+(i-1)\Delta\lambda_2$ is assumed to hold for a sufficiently small wavelength interval $\Delta\lambda_2$.

A signal from the terminal 50 is assumed to arrive at the base station 40 in the direction θ as illustrated in FIG. 3.

When the phase of an RF signal received by the antenna element 43-i is $\phi_{2i}$ and the wavelength of the received RF signal is $\lambda_{RF2}$, the above equation (2) holds, and $\phi_{2i}$ is expressed as $\phi_{2i}=\phi_{21}+(i-1)\Delta\phi_2$. That is, the E/O converter 44-i corresponding to the antenna element 43-i modulates an optical signal of wavelength $\phi_{2i}$ with a received RF signal having a phase of $\phi_{2i}$ and outputs an optically modulated signal of wavelength $\lambda_{2i}$. The optical combiner 45 combines the optically modulated signals of wavelengths $\lambda_{21}, ..., \lambda_{2n}$. The combined optically modulated signal is sent to the accommodation station 20 via the optical circulator 46 and the optical fiber 30. At this time, it is unnecessary to know distance information of the optical fiber 30.

When optically modulated signals of wavelengths $\lambda_{21}, ..., \lambda_{2n}$ are transmitted through an optical fiber, they undergo different delay differences under the influence of chromatic dispersion and thus experience different phase rotations. Because the wavelengths $\lambda_{21}, ..., \lambda_{2n}$ are arranged at equal intervals which are sufficiently small wavelength intervals, the delay differences due to chromatic dispersion can be made at equal intervals and the amounts of phase rotation of the RF signals of the optically modulated signals of wavelengths $\lambda_{21}, ..., \lambda_{2n}$ are also at equal intervals. That is, the amounts of phase rotation $\beta_{21}, ..., \beta_{2n}$ of the RF signals of the optically modulated signals of wavelengths $\lambda_{21}, ..., \lambda_{2n}$ are $\beta_{21}, \beta_{21}-\Delta\beta_2, \beta_{21}-2\Delta\beta_2, ..., \beta_{21}-(n-1)\Delta\beta_2$, respectively, and the amount of phase rotation can be expressed as $\beta_{21}=\beta_{21}-(i-1)\Delta\beta_2$. The amounts of phase rotation $\beta_{21}, ..., \beta_{2n}$ of the RF signals are constants because the wavelengths $\lambda_{21}, ..., \lambda_{2n}$ are fixed. However, the values of the amounts of phase rotation $\beta_{21}, ..., \beta_{2n}$ of the RF signals cannot be specifically obtained if the distance information of the optical fiber 30 is unknown.

The phases of the RF signals of the optically modulated signals of wavelengths $\lambda_{21}, \lambda_{22}, \lambda_{23}, ..., \lambda_{2n}$ received by the accommodation station 20 are $\phi_{21}+\beta_{21}, \phi_{21}+\beta_{21}+\Delta\phi_2-\Delta\beta_2, \phi_{21}+\beta_{21}+2(\Delta\phi_1-\Delta\beta_2), ..., \phi_{21}+\beta_{21}+(n-1)(\Delta\phi_2-\Delta\beta_2)$.

The optically modulated signals of wavelengths $\lambda_{21}, ..., \lambda_{2n}$ that have been transmitted from the base station 40 through the optical fiber pass through the optical circulator 250 of the accommodation station 20 and are fixedly split by the optical demultiplexer 2311 of the first reception unit 231. The optically modulated signal of wavelength $\lambda_{21}$ is sent to the optical combiner 2313 as it is and the optically modulated signals of wavelengths $\lambda_{22}, ..., \lambda_{2n}$ are sent to the phase adjustment units 2312-2, ..., 2312-n, respectively. At this time, it is unnecessary to control the optical demultiplexer 2311 because the optical splitting is fixed.

The reception phase control unit 240 inputs values of $\alpha_2$ to the n 1 phase adjustment units 2312-2, ..., 2312-n. The amounts of phase adjustment of RF signals of the optically modulated signals of wavelengths $\lambda_{21}, \lambda_{22}, \lambda_{23}, ..., \lambda_{2n}$ are 0, $\alpha_2$, $2\alpha_2$, $(n-1)\alpha_2$, respectively, which are at intervals of $\alpha_2$. That is, the phase of the RF signal of the optically modulated signal of each wavelength $\lambda_{2i}$ (i=1, ..., n) can be adjusted by $(i-1)\alpha_2$. When the amount of phase adjustment $\alpha_2$ of the optically modulated signal of wavelength $\lambda 22$ is determined, the amounts of phase adjustment of the optically modulated signals of wavelengths $\lambda_{23}, ..., \lambda_{2n}$ are automatically determined. That is, the phase adjustment unit 2312-i (i=2, ..., n) adjusts the phase of the RF signal of an input optically modulated signal of wavelength $\lambda_{2i}$ by $(i-1)\alpha_2$.

When the above phase adjustment has been performed, the phases of the RF signals of the optically modulated signals of wavelengths $\lambda_{21}, \lambda_{22}, \lambda_{23}, ..., \lambda_{2n}$ are $\phi_{21}+\beta_{21}, \phi_{21}+\beta_{21}+\Delta\phi_2-\Delta\beta_2+\alpha_2, \phi_{21}+\beta_{21}+2(\Delta\phi_2-\Delta\beta_2+\alpha_2), ..., \phi_{21}+\beta_{21}+(n-1)(\Delta\phi_2-\Delta\beta_2+\alpha_2)$, respectively. At this time, if $\alpha_2=\Delta\beta_2-\Delta\phi_2$, the phases of the RF signals of the optically modulated signals of wavelengths $\lambda_{21}, ..., \lambda_{2n}$ are in phase at $\phi_{21}+\beta_{21}$ and thus a receiving antenna beam is formed in the direction θ. If the distance information of the optical fiber 30 is unknown, the values of the amounts of phase rotation $\beta_{21}, ..., \beta_{2n}$ of the RF signals cannot be specifically obtained as described above. Therefore, $\Delta\beta_2$ is a constant whose specific value is unknown and a value of $\alpha_2=\Delta\beta_2-\Delta\phi_2$ corresponding to the reception beam direction θ cannot be specifically obtained. Thus, there is a need to scan the values of $\alpha_2$ to obtain a value of $\alpha_2=\Delta\beta_2-\Delta\phi_2$ that maximizes the received power.

Here, a variable that determines the reception beam direction θ is only $\alpha_2$ and the reception beam direction θ can be changed by changing the value of $\alpha_2$. Basically, there is no need to control the base station 40 in controlling the reception beam direction because the accommodation station 20 controls $\alpha_2$.

4.1.3 Process of Determining Beam Directions of Receiving/Transmitting Antennas

The process of determining beam directions of the receiving/transmitting antennas is similar to that of FIG. 6 described above.

The accommodation station 20 generates p beacons B(1), ..., B(p) as RF signals and inputs them to the optical modulation unit 2112 in order. The optical modulation unit 2112 modulates optical signals of wavelengths $\lambda_{11}, ..., \lambda_{1n}$ output by the multi-wavelength light source 2111 with each beacon B(j) (j=1, ..., p) and outputs optically modulated beacons B(j) of wavelengths $\lambda_{11}, ..., \lambda_{1n}$.

The optical demultiplexer 2113 splits the optically modulated beacons B(j) of wavelengths $\lambda_{11}, ..., \lambda_{1n}$.

The optically modulated beacon B(j) of wavelength $\lambda_{11}$ is output to the optical combiner 2115 as it is. The phase adjustment units 2114-2, ..., 2114-n adjust the phases of the optically modulated beacons B(j) of wavelengths $\lambda_{12}, ..., \lambda_{1n}$ using $\alpha_1=\alpha_{1j}$ under the control of the transmission phase control unit 220. Thus, for each of the p optically modulated beacons B(1), ..., B(p), the transmission phase control unit 220 instructs the phase adjustment units 2114-2, ..., 2114-n with a corresponding one of the different values $\alpha_{11}, ...,$ $\alpha_{1p}$ which are values of $\alpha_1$ corresponding to the p optically modulated beacons B(1), ..., B(p).

The optical combiner 2115 combines the phase-adjusted optically modulated beacons B(j) of wavelengths $\lambda_{11}, \ldots, \lambda_{1n}$. The combined optically modulated beacon B(j) is transmitted through the optical fiber, then O/E converted at the base station 40, and is radiated from the antenna elements 43-1, ..., 43-n as beacons B(j). At this time, the beacons B(j) are radiated in a direction $\theta_j$ that satisfies the above equation (3).

Performing the above operations for the p beacons B(1), ..., B(p) allows the wireless communication system 10 to transmit the beacons B(1), ..., B(p) from the base station 40 in p different directions $\theta_1, \ldots, \theta_p$, respectively, as illustrated in FIG. 5 (steps S11 to S13 in FIG. 6).

The antenna elements 51-1, ..., 51-m of the terminal 50 receive the p beacons B(1), ..., B(p) from the base station 40. The receiving antenna control unit 53 outputs the p beacons B(1), ..., B(p) received by the antenna elements 51-1, ..., 51-m to the received power calculation unit 54 and the demodulation unit 55. The received power calculation unit 54 calculates the received powers of the received p beacons B(1), ..., B(p) and outputs the calculation result. The demodulation unit 55 demodulates the received p beacons B(1), ..., B(p) and outputs beacon numbers.

Based on the received powers and beacon numbers of the beacons input from the received power calculation unit 54 and the demodulation unit 55, the maximum received power beacon selection unit 56 selects a beacon number with the maximum received power and outputs corresponding beacon number information (step S14 in FIG. 6). The transmitting antenna control unit 57 performs control such that the beacon number information output by the maximum received power beacon selection unit 56 is transmitted to the base station 40 through the antenna elements 51-1, ..., 51-m. The terminal 50 transmits this beacon number information q times (step S15 in FIG. 6).

The E/O converters 44-1, ..., 44-n of the base station 40 E/O convert the beacon number information which the antenna elements 43-1, ..., 43-n have received from the terminal 50 (step S16 in FIG. 6). The optical combiner 45 combines optically modulated beacon number information of wavelengths 721, obtained through the E/O conversion and transmits the combined information to the accommodation station 20. Because the beacon number information has been transmitted from the terminal 50 q times, the base station 40 transmits the optically modulated beacon number information to the accommodation station 20 q times at different timings (step S17 in FIG. 6).

The optical demultiplexer 2311 of the accommodation station 20 splits the optically modulated beacon number information transmitted from the base station 40 into optically modulated beacon number information of wavelengths $\lambda_{21}, \ldots, \lambda_{2n}$. The optically modulated beacon number information of wavelength $\lambda_{21}$ is sent to the optical combiner 2313 as it is and the optically modulated beacon number information of the wavelengths $\lambda_{22}, \ldots, \lambda_{2n}$ is phase-adjusted by the phase adjustment units 2312-2, ..., 2312-n, respectively. At this time, the phase adjustment units 2312-2, ..., 2312-n adjust the phases of q pieces of received the optically modulated beacon number information using $\alpha_{21}, \ldots, \alpha_{2q}$, which are different values of $\alpha_2$, under the control of the reception phase control unit 240. Therefore, each time the optically modulated beacon number information is received, the reception phase control unit 240 changes the value of $\alpha_2$ in the order of $\alpha_{21}, \ldots, \alpha_{2q}$ and instructs the phase adjustment units 2312-2, ..., 2312-n with the changed value of az.

The optical combiner 2313 combines the optically modulated beacon number information of wavelength $\lambda_{21}$ and the optically modulated beacon number information of wavelengths $\lambda_{22}, \ldots, \lambda_{2n}$ which have been phase-adjusted respectively by the phase adjustment units 2312-2, ..., 2312-n and outputs the combined optically modulated beacon number information to the O/E converter 2314. The O/E converter 2314 O/E converts the combined optically modulated beacon number information to obtain beacon number information. The O/E converter 2314 outputs the beacon number information to the received power calculation unit 2315 and the demodulation unit 2316.

The received power calculation unit 2315 receives q pieces of beacon number information on which different phase adjustments have been performed, calculates their received powers, and notifies the reception phase control unit 240 of the calculated received powers. The reception phase control unit 240 determines a value of $\alpha_2$ which maximizes the received power based on the notified received powers. In this way, the accommodation station 20 receives q pieces of beacon number information while scanning the values of $\alpha_2$ and selects a value of $\alpha_2$ which maximizes the received power to determine the value of $\alpha_2$. This determines the beam direction of receiving antennas (step S18 in FIG. 6). The reception phase control unit 240 controls the first reception unit 231 such that it uses the determined value of $\alpha_2$ when receiving a signal from the terminal 50.

The demodulation unit 2316 demodulates received beacon number information and outputs the demodulated beacon number information to the transmission phase control unit 220. The transmission phase control unit 220 determines a value of $\alpha_1$ based on the beacon number information.

This determines the beam direction of transmitting antennas (step S19 in FIG. 6). The transmission phase control unit 220 controls the first transmission unit 211 such that it uses the determined value of $\alpha_1$ when transmitting a signal to the terminal 50.

Thus, the base station 40 only needs to perform O/E and E/O conversion of signals received from the accommodation station 20 and the terminal 50 and does not need to perform control for the beam direction control.

4.2 When Second Transmission Unit and Second Reception Unit are Used (Operation Example 2)

In operation example 2, the second transmission unit 212 illustrated in FIG. 9 and the second reception unit 232 illustrated in FIG. 11 are used as the transmission unit 210 and the reception unit 230 of the accommodation station 20. For phase adjustment of optically modulated transmission signals and optically modulated received signals, the accommodation station 20 adjusts the phases of RF signals of the optically modulated transmission signals and optically modulated received signals.

4.2.1 Beamforming of Transmitting Antennas

The multi-wavelength light source 2121 of the accommodation station 20 generates optical signals of n different wavelengths $\lambda_{11}, \ldots, \lambda_{1n}$. Here, the wavelengths $\lambda_{11}, \ldots, \lambda_{1n}$ are assumed to be arranged at equal intervals which are sufficiently small wavelength intervals. That is, $\lambda_{1i} = \lambda_{11} + (i-1)\Delta\lambda_1$ is assumed to hold for a sufficiently small wavelength interval $\Delta\lambda_1$. The optical demultiplexer 2122 splits optical signals of wavelengths $\lambda_{11}, \ldots, \lambda_{in}$ and inputs them to the optical modulation units 2125-1, ..., 2125-n, respectively.

The transmission phase control unit 220 inputs values of $\alpha_1$ to the n-1 phase adjustment units 2124-2, ..., 2124-$n$. The splitting unit 2123 splits an RF signal into n RF signals and outputs the RF signals to the optical modulation unit 2125-1 and the phase adjustment units 2124-2, ..., 2124-$n$. Each phase adjustment unit 2124-$i$ ($i=2, ..., n$) adjusts the phase of an RF signal input from the splitting unit 2123 by $(i-1)\alpha_1$ and outputs an RF signal ($i$).

The optical modulation unit 2125-1 modulates the optical signal of wavelength $\lambda_{11}$ with the RF signal and outputs an optically modulated signal of wavelength $\lambda_{11}$. Each optical modulation unit 2125-$i$ ($i=2, ..., n$) modulates the optical signal of wavelength $\lambda_{1i}$ with the RF signal ($i$) and outputs an optically modulated signal of wavelength $\lambda_{1i}$. The optical modulation units 2125-1, ..., 2125-$n$ may have a function of handling fading due to chromatic dispersion, similar to the operation example 1.

The optical combiner 2115 combines the optically modulated signals of wavelengths $\lambda_{11}, ..., \lambda_{1n}$. The combined optically modulated signal is sent to the base station 40 via the optical circulator 250 and the optical fiber 30. At this time, it is unnecessary to know distance information of the optical fiber 30.

Similar to the operation example 1, when optically modulated signals of wavelengths $\lambda_{11}, ..., \lambda_{1n}$ are transmitted through an optical fiber, they undergo different delay differences under the influence of chromatic dispersion and thus experience different phase rotations. Because the wavelengths $\lambda_{11}, ..., \lambda_{1n}$ are arranged at equal intervals which are sufficiently small wavelength intervals, the delay differences due to chromatic dispersion can also be made at equal intervals and the amounts of phase rotation of the RF signals of the optically modulated signals of wavelengths $\lambda_{11}, ..., \lambda_{1n}$ are also at equal intervals. That is, the amounts of phase rotation $\beta_{11}, ..., \beta_{1n}$ of the RF signals of the optically modulated signals of wavelengths $\lambda_{11}, ..., \lambda_{1n}$ are $\beta_{11}, \beta_{11}-\Delta\beta_1, \beta_{11}-2\Delta\beta_1, ..., \beta_{11}-(n-1)\Delta\beta_1$, respectively, and can be expressed as $\beta_{1i}=\beta_{11}-(i-1)\Delta\beta_1$. The amounts of phase rotation $\beta_{11}, ..., \beta_{1n}$ of the RF signals are constants because the wavelengths $\lambda_{11}, ..., \lambda_{1n}$ are fixed. However, the values of the amounts of phase rotation $\beta_{11}, ..., \beta_{1n}$ of the RF signals cannot be specifically obtained if the distance information of the optical fiber is unknown.

The operations of the base station 40 and the terminal 50 are similar to those of the operation example 1. That is, the optically modulated signals of wavelengths $\lambda_{11}, ..., \lambda_{1n}$ which have been transmitted from the accommodation station 20 to the base station 40 through the optical fiber are fixedly split by the optical demultiplexer 41 after passing through the optical circulator 46. It is unnecessary to control the optical demultiplexer 41 because the optical splitting is fixed. The O/E converters 42-1, ..., 42-$n$ convert the optically modulated signals of wavelengths $\lambda_{11}, ..., \lambda_{1n}$ split by the optical demultiplexer 41 into RF signals, respectively. The RF signal of the optically modulated signal of wavelength $\lambda_{11}$ is phase-adjusted by $(i-1)\alpha_1$ at the accommodation station 20 and further experiences a phase rotation of $\beta_{1i}=\beta_{11}-(i-1)\Delta\beta_1$ during transmission through the optical fiber. The phase $\phi_{1i}$ of the wavelength $\lambda_{11}$ is arranged such that $\phi_{1i}=(i-1)\alpha_1+\beta_{1i}=\beta_{11}+(i-1)(\alpha_1+\Delta\beta_1)$, and an RF signal with the phase $\phi_{1i}$ is radiated from the antenna element 43-$i$.

Similar to the operation example 1, the phase difference between transmitted RF signals radiated from adjacent antenna elements 43-($i+1$) and 43-$i$ is $\phi_{1(i+1)}-\phi_{1i}=\alpha_1-\Delta\beta_1$, so that the phase difference between adjacent antenna elements is constant at $\alpha_1-\Delta\beta_1$. When the wavelength of the transmitted RF signal is $\lambda_{RF1}$ and the transmission beam direction $\theta$ is defined as illustrated in FIG. 3 assuming that the antenna elements 43-1, ..., 43-$n$ are arranged at equal intervals d, a transmission beam is formed in a direction satisfying the above equation (1).

Similar to the operation example 1, the wavelength $\lambda_{RF1}$ of the transmitted RF signal and the antenna element interval d are known constants. Because the wavelengths $\lambda_{11}, ..., \lambda_{1n}$ are fixed, $\Delta\beta_1$ is also a constant. However, if the distance information of the optical fiber 30 is unknown, the values of the amounts of phase rotation $\beta_{11}, ..., \beta_{1n}$ of the RF signals cannot be specifically obtained and a specific value of $\Delta\beta_1$ cannot be obtained. Thus, $\alpha_1$ alone determines the transmission beam direction $\theta$. This means that a transmission beam can be formed in a certain direction $\theta$ by changing the value of $\alpha_1$, while the specific direction is unknown. However, basically, there is no need to control the base station in forming the transmission beam because the accommodation station 20 alone controls $\alpha_1$.

Similar to the operation example 1, if the distance information of the optical fiber is unknown, the direction $\theta$ of the transmission beam formed by the base station 40 is unknown. Thus, feedback from the terminal 50, which is a communication partner of the base station 40, is required to determine the transmission beam direction. A process of determining the transmission beam direction will be described in detail after beamforming of the receiving antennas is described.

4.2.2 Beamforming of Receiving Antennas

Operations when the n antenna elements 43-1, ..., 43-$n$ of the base station 40 receive RF signals from the terminal 50 are similar to those of the operation example 1. That is, the received RF signals are sent to the E/O converters 44-1, ..., 44-$n$ via the electrical circulators 47-1, ..., 47-$n$. The E/O converters 44-1, ..., 44-$n$ modulate optical signals of wavelengths $\lambda_{21}, ..., \lambda_{2n}$ with the received RF signals and output optically modulated signals of wavelengths $\lambda_{21}, ..., \lambda_{2n}$. Here, the wavelengths $\lambda_{21}, ... \lambda_{2n}$ are assumed to be arranged at equal intervals which are sufficiently small wavelength intervals. That is, $\lambda_{2i}=\lambda_{21}+(i-1)\Delta\lambda_2$ is assumed to hold for a sufficiently small wavelength interval $\Delta\lambda_2$.

Similar to the operation example 1, a signal from the terminal 50 is assumed to arrive at the base station 40 in the direction $\theta$ as illustrated in FIG. 3. When the phase of an RF signal received by the antenna element 43-$i$ is $\phi_{2i}$, the above equation (2) holds, and $\phi_{2i}$ is expressed as $\phi_{2i}=\phi_{21}+(i-1)\Delta\phi_2$. The E/O converter 44-$i$ corresponding to the antenna element 43-$i$ modulates an optical signal of wavelength $\lambda_{2i}$ with a received RF signal having a phase of $\phi_{2i}$ and outputs an optically modulated signal of wavelength $\phi_{2i}$. The optical combiner 45 combines the optically modulated signals of wavelengths $\lambda_{21}, ..., \lambda_{2n}$. The combined optically modulated signal is sent to the accommodation station 20 via the optical circulator 46 and the optical fiber 30. At this time, it is unnecessary to know distance information of the optical fiber 30.

Similar to the operation example 1, when optically modulated signals of wavelengths $\lambda_{21}, ..., \lambda_{2n}$ are transmitted through an optical fiber, they undergo different delay differences under the influence of chromatic dispersion and thus experience different phase rotations. Because the wavelengths $\lambda_{21}, ..., \lambda_{2n}$ are arranged at equal intervals which are sufficiently small wavelength intervals, the delay differences due to chromatic dispersion can be made at equal intervals and the amounts of phase rotation of the RF signals of the optically modulated signals of wavelengths $\lambda_{21}, ..., \lambda_{2n}$ are also at equal intervals. That is, the amounts of phase rotation $\beta_{21}, ..., \beta_{2n}$ of the RF signals of the optically modulated signals of wavelengths $\lambda_{21}, \ldots, \lambda_{2n}$ are $\beta_{21}, \beta_{21}-\Delta\beta_2, \beta_{21}-2\Delta\beta_2, \ldots, \beta_{21}-(n-1)\Delta\beta_2$, respectively, and the amount of phase rotation can be expressed as $\beta_{2i}=\beta_{21}-(i-1)\Delta\beta_2$. The amounts of phase rotation $\beta_{21}, \ldots, \beta_{2n}$ of the RF signals are constants because the wavelengths $\lambda_{21}, \ldots, \lambda_{2n}$ are fixed. However, the values of the amounts of phase rotation $\beta_{21}, \ldots, \beta_{2n}$ of the RF signals cannot be specifically obtained if the distance information of the optical fiber 30 is unknown. In addition, similar to the operation example 1, the phases of the RF signals of the optically modulated signals of wavelengths $\lambda_{21}, \lambda_{22}, \lambda_{23}, \ldots, \lambda_{2n}$ received by the accommodation station 20 are $\phi_{21}+\beta_{21}$, $\phi_{21}+\beta_{21}+\Delta\phi_2-\Delta\beta_2$, $\phi_{21}+\beta_{21}+2(\Delta\phi_2-\Delta\beta_2), \ldots, \phi_{21}+\beta_{21}+(n-1)(\Delta\phi_2-\Delta\beta_2)$.

The optically modulated signals of wavelengths $\lambda_{21}, \ldots, \lambda_{2n}$ that have been transmitted from the base station 40 through the optical fiber pass through the optical circulator 250 of the accommodation station 20 and are fixedly split by the optical demultiplexer 2321 of the second reception unit 232. The O/E converters 2322-1, ..., and 2322-n perform O/E conversion of the optically modulated signals of wavelengths $\lambda_{21}, \ldots, \lambda_{2n}$, respectively, to obtain received signals (1), ..., (n). The O/E converter 2322-i (i=1, ..., n) outputs the received signal (i) obtained through the O/E conversion. The received signals (2), ..., (n) are input to the phase adjustment units 2323-2, ..., 2323-n, respectively.

The reception phase control unit 240 inputs values of $\alpha_2$ to the n−1 phase adjustment units 2323-2, ..., 2323-n. The amounts of phase adjustment of RF signals of the received signals (1), (2), (3), ..., (n) are 0, $\alpha_2$, $2\alpha_2$, ..., $(n-1)\alpha_2$, respectively, which are at intervals of $\alpha_2$. That is, the phase of the RF signal of each received signal (i) (i=1, ..., n) can be adjusted by $(i-1)\alpha_2$.

When the amount of phase adjustment $\alpha_2$ of the received signal (2) is determined, the amounts of phase adjustment of the received signals (3), ..., (n) are automatically determined. That is, the phase adjustment unit 2323-i (i=2, ..., n) adjusts the phase of the RF signal of the received signal (i) by $(i-1)\alpha_2$.

When the above phase adjustment has been performed, the phases of the RF signals of the received signals (1), (2), (3), ..., (n) are $\phi_{21}+\beta_{21}$, $\phi_{21}+\beta_{21}+\Delta\phi_2-\Delta\beta_2+\alpha_2$, $\phi_{21}+\beta_{21}+2(\Delta\phi_2-\Delta\beta_2+\alpha_2), \ldots, \phi_{21}+\beta_{21}+(n-1)(\Delta\phi_2-\Delta\beta_2+\alpha_2)$, respectively. At this time, if $\alpha_2=\Delta\beta_2-\Delta\phi_2$, the phases of the RF signals of the received signals (1), (2), (3), ..., (n) are in phase at $\phi_{21}+\beta_{21}$ and thus a receiving antenna beam is formed in the direction $\theta$. If the distance information of the optical fiber 30 is unknown, the values of the amounts of phase rotation $\beta_{21}, \ldots, \beta_{2n}$ of the RF signals cannot be specifically obtained as described above. Therefore, $\Delta\beta_2$ is a constant whose specific value is unknown and a value of $\alpha_2=\Delta\beta_2-\Delta\phi_2$ corresponding to the reception beam direction $\theta$ cannot be specifically obtained. Thus, there is a need to scan the values of $\alpha_2$ to obtain a value of $\alpha_2=\Delta\beta_2-\Delta\phi_2$ that maximizes the received power.

Here, a variable that determines the reception beam direction $\theta$ is only $\alpha_2$ and the reception beam direction $\theta$ can be changed by changing the value of $\alpha_2$, similar to the operation example 1. Basically, there is no need to control the base station 40 in controlling the reception beam direction because the accommodation station 20 controls $\alpha_2$.

4.2.3 Process of Determining Beam Directions of Receiving/Transmitting Antennas

The process of determining beam directions of the receiving/transmitting antennas is similar to that of FIG. 6 described above.

The accommodation station 20 generates p beacons B(1), ..., B(p) as RF signals and the splitting unit 2123 inputs them to the optical modulation unit 2125-1 and the phase adjustment units 2124-2, ..., 2124-n in order. Each phase adjustment unit 2124-i (i=2, ..., n) adjusts the phase of the beacon B(j) (j=1, ..., p) using $\alpha_1=\alpha_{1j}$ under the control of the transmission phase control unit 220. Thus, for each of the p beacons B(1), ..., B(p), the transmission phase control unit 220 instructs the phase adjustment units 2124-2, ..., 2124-n with a corresponding one of the different values $\alpha_{11}, \ldots, \alpha_{1p}$ which are values of $\alpha_1$ corresponding to the p beacons B(1), ..., B(p).

The optical modulation unit 2125-1 modulates the optical signal of wavelength $\lambda_1$ using the beacon B(j) and outputs an optically modulated beacon B(j) of wavelength $\lambda_{11}$. Each optical modulation unit 2125-i (i=2, ..., n) modulates the optical signal of wavelength $\lambda_{1i}$ using the beacon B(j) which has been phase-modulated by the phase adjustment unit 2124-i and outputs an optically modulated beacon B(j) of wavelength $\lambda_{1i}$.

The optical combiner 2126 combines the phase-adjusted optically modulated beacons B(j) of wavelengths $\lambda_{11}, \ldots, \lambda_{1n}$. The combined optically modulated beacon B(j) is transmitted through the optical fiber, then O/E converted at the base station 40, and is radiated from the antenna elements 43-1, ..., 43-n as beacons B(j). At this time, the beacons B(j) are radiated in a direction $\theta_j$ that satisfies the above equation (3).

Similar to the operation example 1, performing the above operations for the p beacons B(1), ..., B(p) allows the wireless communication system 10 to transmit the beacons B(1), ..., B(p) from the base station 40 in p different directions $\theta_1, \ldots, \theta_p$, respectively, as illustrated in FIG. 5 (steps S11 to S13 in FIG. 6).

The terminal 50 operates similar to the operation example 1. That is, the receiving antenna control unit 53 of the terminal 50 outputs the p beacons B(1), ..., B(p) received by the antenna elements 51-1, ..., 51-m to the received power calculation unit 54 and the demodulation unit 55. The received power calculation unit 54 calculates the received powers of the received p beacons B(1), ..., B(p) and outputs the calculation result. The demodulation unit 55 demodulates the received p beacons B(1), ..., B(p) and outputs beacon numbers. Based on the received powers and beacon numbers of the beacons input from the received power calculation unit 54 and the demodulation unit 55, the maximum received power beacon selection unit 56 selects a beacon number with the maximum received power and outputs corresponding beacon number information (step S14 in FIG. 6). The transmitting antenna control unit 57 performs control such that the beacon number information output by the maximum received power beacon selection unit 56 is transmitted to the base station 40 through the antenna elements 51-1, ..., 51-m. The terminal 50 transmits this beacon number information q times (step S15 in FIG. 6).

Similar to the operation example 1, the base station 40 E/O converts the beacon number information received from the terminal 50 and transmits optically modulated beacon number information of wavelengths $\lambda_{21}, \ldots, \lambda_{2n}$ to the accommodation station 20 (step S16 in FIG. 6). Because the beacon number information has been transmitted from the terminal 50 q times, the base station 40 transmits the optically modulated beacon number information to the accommodation station 20 q times (step S17 in FIG. 6).

The optical demultiplexer 2321 of the accommodation station 20 splits the optically modulated beacon number information transmitted from the base station 40 into optically modulated beacon number information of wavelengths $\lambda_{21}, \ldots, \lambda_{2n}$. The O/E converters $2322\text{-}1, \ldots, 2322\text{-}n$ O/E convert the optically modulated beacon number information of wavelengths $\lambda_{21}, \ldots, \lambda_{2n}$ to obtain received beacon number information (1), . . . , (n). The received beacon number information (2), . . . , (n) is output to the phase adjustment units 2323-2, . . . , 2323-$n$, respectively.

The phase adjustment units 2323-2, . . . , 2323-$n$ adjust the phases of the received beacon number information (2), . . . , (n), respectively. At this time, the phase adjustment units 2323-2, . . . , 2323-$n$ adjust the phases of q pieces of received beacon number information using $\alpha_{21}, \ldots, \alpha_{2q}$, which are different values of $\alpha_2$, under the control of the reception phase control unit 240. Therefore, each time the optically modulated beacon number information is received, the reception phase control unit 240 changes the value of $\alpha_2$ in the order of $\alpha_{21}, \ldots, \alpha_{2q}$ and instructs the phase adjustment units 2323-2, . . . , 2323-$n$ with the changed value of $\alpha_2$.

The received beacon number information (1) output by the O/E converter 2322-1 and the received beacon number information (2), . . . , (n) which has been phase-adjusted respectively by the phase adjustment units 2323-2, . . . , 2323-$n$ are combined and output to the received power calculation unit 2324 and the demodulation unit 2325.

Similar to the operation example 1, the received power calculation unit 2324 receives q pieces of beacon number information on which different phase adjustments have been performed, calculates their received powers, and notifies the reception phase control unit 240 of the calculated received powers. The reception phase control unit 240 determines a value of $\alpha_2$ which maximizes the received power based on the notified received powers. In this way, the accommodation station 20 receives q pieces of beacon number information while scanning the values of $\alpha_2$ and selects a value of $\alpha_2$ which maximizes the received power to determine the value of $\alpha_2$. This determines the beam direction of receiving antennas (step S18 in FIG. 6). The reception phase control unit 240 controls the second reception unit 232 such that it uses the determined value of $\alpha_2$ when receiving a signal from the terminal 50.

Similar to the operation example 1, the demodulation unit 2325 demodulates received beacon number information and outputs the demodulated beacon number information to the transmission phase control unit 220. The transmission phase control unit 220 determines a value of $\alpha_1$ based on the beacon number information. This determines the beam direction of transmitting antennas (step S19 in FIG. 6). The transmission phase control unit 220 controls the second transmission unit 212 such that it uses the determined value of $\alpha_1$ when transmitting a signal to the terminal 50.

Thus, the base station 40 only needs to perform O/E and E/O conversion of signals received from the accommodation station 20 and the terminal 50 and does not need to perform control for the beam direction control.

4.3 When First Transmission Unit and Second Reception Unit are Used (Operation Example 3)

In operation example 3, the first transmission unit 211 illustrated in FIG. 8 and the second reception unit 232 illustrated in FIG. 11 are used as the transmission unit 210 and the reception unit 230 of the accommodation station 20. The accommodation station 20 adjusts the phases of optically modulated signals for phase adjustment of optically modulated transmission signals and adjusts the phases of RF signals for phase adjustment of optically modulated received signals. That is, the wireless communication system 10 performs operations similar to those of the operation example 1 in the beamforming of transmitting antennas and performs operations similar to those of the operation example 2 in the beamforming of receiving antennas.

4.4 When Second Transmission Unit and First Reception Unit are Used (Operation Example 4)

In operation example 4, the second transmission unit 212 illustrated in FIG. 9 and the first reception unit 231 illustrated in FIG. 10 are used as the transmission unit 210 and the reception unit 230 of the accommodation station 20. The accommodation station 20 adjusts the phases of RF signals for phase adjustment of optically modulated transmission signals and adjusts the phases of optically modulated signals for phase adjustment of optically modulated received signals. That is, the wireless communication system 10 performs operations similar to those of the operation example 2 in the beamforming of transmitting antennas and performs operations similar to those of the operation example 1 in the beamforming of receiving antennas.

5. Modifications of Transmission and Reception Units 5.1 Modifications of First Transmission Unit The configurations of first transmission units 211$a$, 211$b$, 211$c$, and 211$d$, which are modifications of the first transmission unit 211 used as the transmission unit 210 of the accommodation station 20, will be described with reference to FIGS. 14, 15, 16, and 17.

Figure 14:
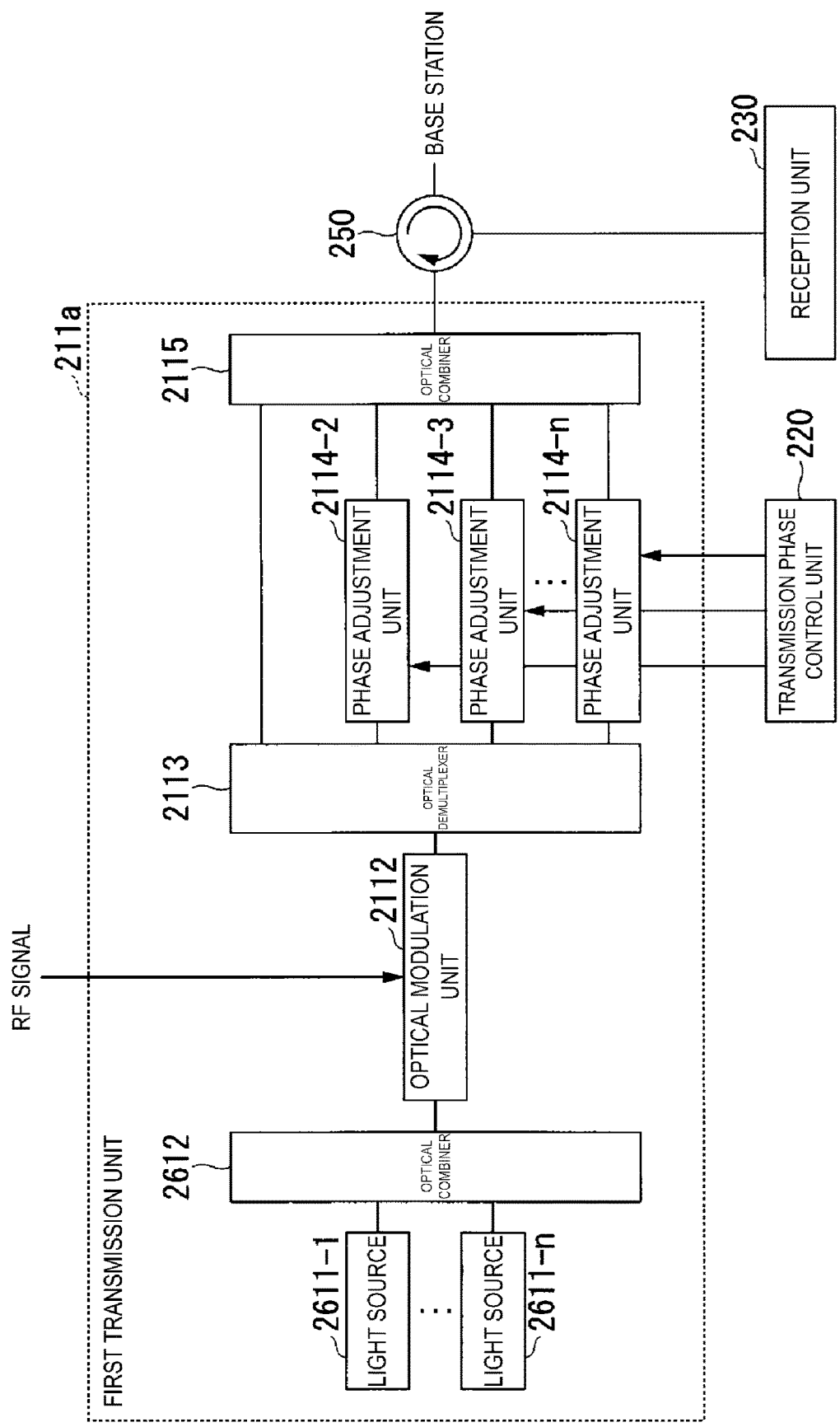
FIG. 14 is a block diagram illustrating a modification of the first transmission unit according to the embodiment.

FIG. 14 is a diagram illustrating the configuration of the first transmission unit 211$a$. In FIG. 14, the same parts as those of the first transmission unit 211 illustrated in FIG. 8 are denoted by the same reference signs and the description thereof will be omitted. The first transmission unit 211$a$ illustrated in FIG. 14 differs from the first transmission unit 211 illustrated in FIG. 8 in that it includes n light sources 2611-1, . . . , 2611-$n$ and an optical combiner 2612 instead of the multi-wavelength light source 2111. The light sources 2611-$i$ ($i=1, \ldots, n$) output light of wavelengths $\lambda_{1i}$. The optical combiner 2612 combines light of the wavelengths $\lambda_{11}, \ldots, \lambda_{1n}$ output respectively by the light sources 2611-1, . . . , 2611-$n$ and outputs the combined light to the optical modulation unit 2112.

Figure 15:
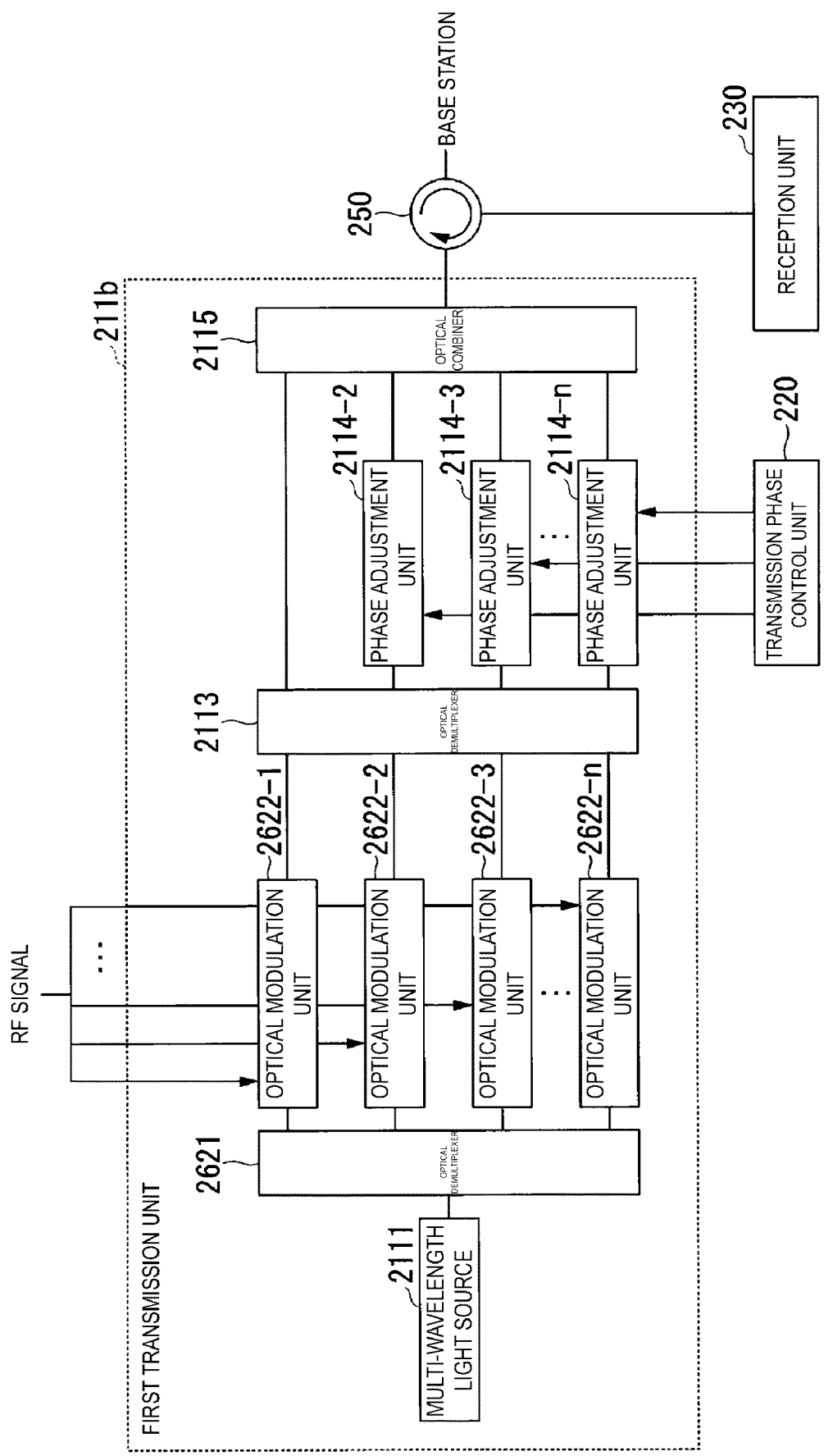
FIG. 15 is a block diagram illustrating a modification of the first transmission unit according to the embodiment.

FIG. 15 is a diagram illustrating the configuration of the first transmission unit 211$b$. In FIG. 15, the same parts as those of the first transmission unit 211 illustrated in FIG. 8 are denoted by the same reference signs and the description thereof will be omitted. The first transmission unit 211$b$ illustrated in FIG. 15 differs from the first transmission unit 211 illustrated in FIG. 8 in that it includes an optical demultiplexer 2621 and optical modulation units 2622-1, . . . , 2622-$n$ instead of the optical modulation unit 2112. The optical demultiplexer 2621 demultiplexes light of wavelengths $\lambda_{11}, \ldots, \lambda_{1n}$ output by the multi-wavelength light source 2111 and outputs the demultiplexed light of wavelengths $\lambda_{1i}$ ($i=1, \ldots, n$) to the optical modulation units 2622-$i$. Each optical modulation unit 2622-$i$ ($i=1, \ldots, n$) modulates light of wavelength $\lambda_{1i}$ with an RF signal and outputs the modulated light to the optical demultiplexer 2113.

Figure 16:
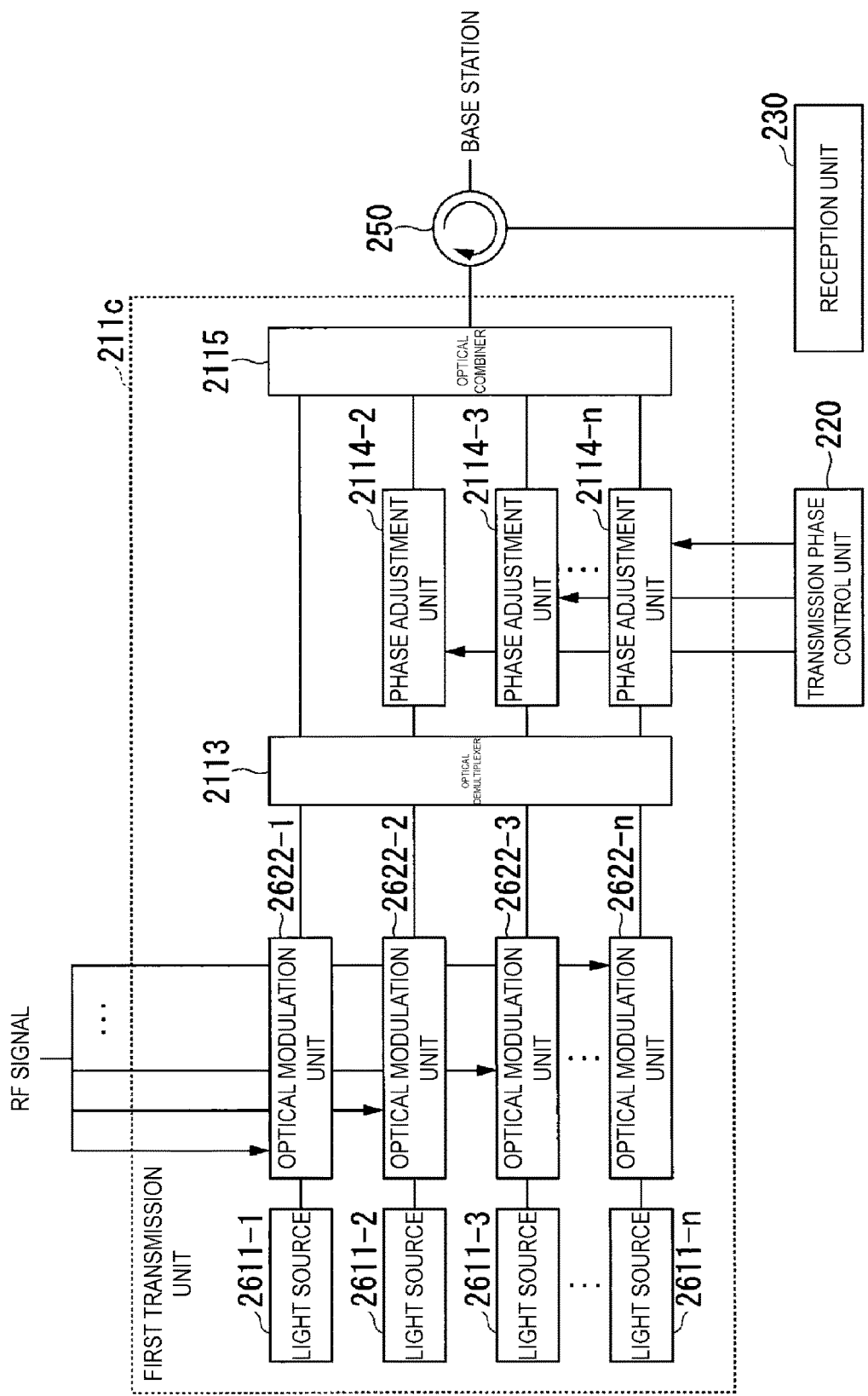
FIG. 16 is a block diagram illustrating a modification of the first transmission unit according to the embodiment.

FIG. 16 is a diagram illustrating the configuration of the first transmission unit 211$c$. In FIG. 16, the same parts as those of the first transmission units 211$a$ and 211$b$ illustrated in FIGS. 14 and 15 are denoted by the same reference signs and the description thereof will be omitted. The first transmission unit 211$c$ illustrated in FIG. 16 differs from the first transmission unit 211$b$ illustrated in FIG. 15 in that it includes light sources 2611-1, . . . , 2611-$n$ instead of the multi-wavelength light source 2111 and the optical demultiplexer 2621. The light sources 2611-$i$ ($i=1, \ldots, n$) output light of wavelengths $\lambda 1i$. Each optical modulation unit 2622-$i$ ($i=1, \ldots, n$) modulates light of wavelength $\lambda_{1i}$ output by the light source 2611-$i$ with an RF signal and outputs the modulated light to the optical demultiplexer 2113.

Figure 17:
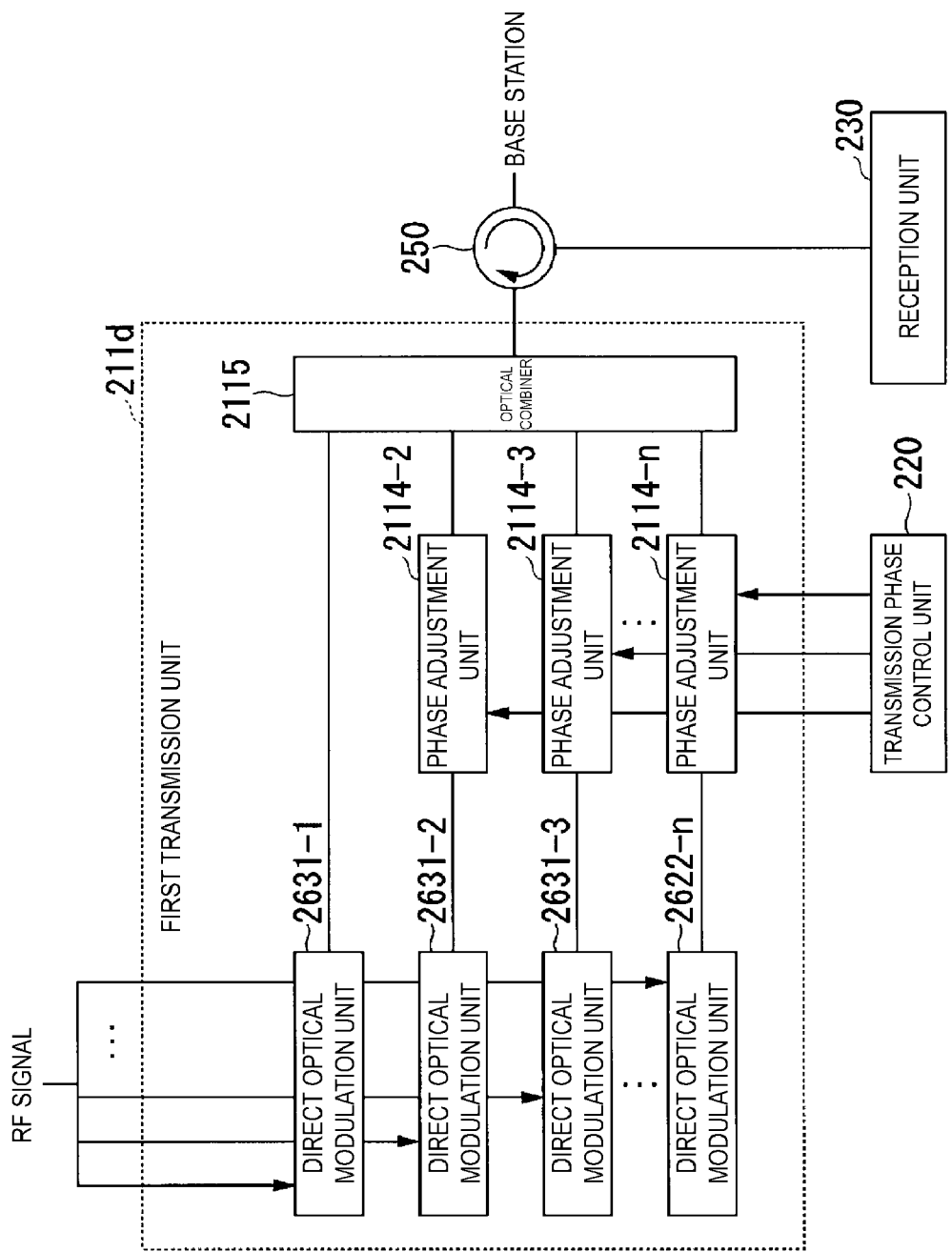
FIG. 17 is a block diagram illustrating a modification of the first transmission unit according to the embodiment.

FIG. 17 is a diagram illustrating the configuration of the first transmission unit 211$d$. In FIG. 17, the same parts as those of the first transmission unit 211 illustrated in FIG. 8 are denoted by the same reference signs and the description thereof will be omitted. The first transmission unit 211$d$ illustrated in FIG. 17 differs from the first transmission unit 211 illustrated in FIG. 8 in that it includes n direct optical modulation units 2631-1, . . . , 2631-$n$ instead of the multi-wavelength light source 2111, the optical modulation unit 2112, and the optical demultiplexer 2113. Each direct optical modulation unit 2631-$i$ ($i=1, \ldots, n$) outputs an optically modulated signal obtained by modulating light of wavelength $\lambda_{1i}$ with an RF signal. The phase adjustment unit 2124-$i$ ($i=2, \ldots, n$) adjusts the phase of the optically modulated signal of wavelength $\lambda_{1i}$ output by the direct optical modulation unit 2631-$i$ under the control of the transmission phase control unit 220 and then outputs the phase-adjusted optically modulated signal to the optical combiner 2115. The optical combiner 2115 combines the optically modulated signal of $\lambda_{11}$ output by the direct optical modulation unit 2631-1 and the optically modulated signals of $\lambda_{12}$ to $\lambda_{1n}$ output by the phase adjustment units 2114-2, . . . , 2114-$n$ and outputs the combined optically modulated signal to the optical circulator 250.

5.2 Modifications of Second Transmission Unit

The configurations of second transmission units 212$a$ and 212$b$, which are modifications of the second transmission unit 212 used as the transmission unit 210 of the accommodation station 20, will be described with reference to FIGS. 18 and 19 below.

Figure 18:
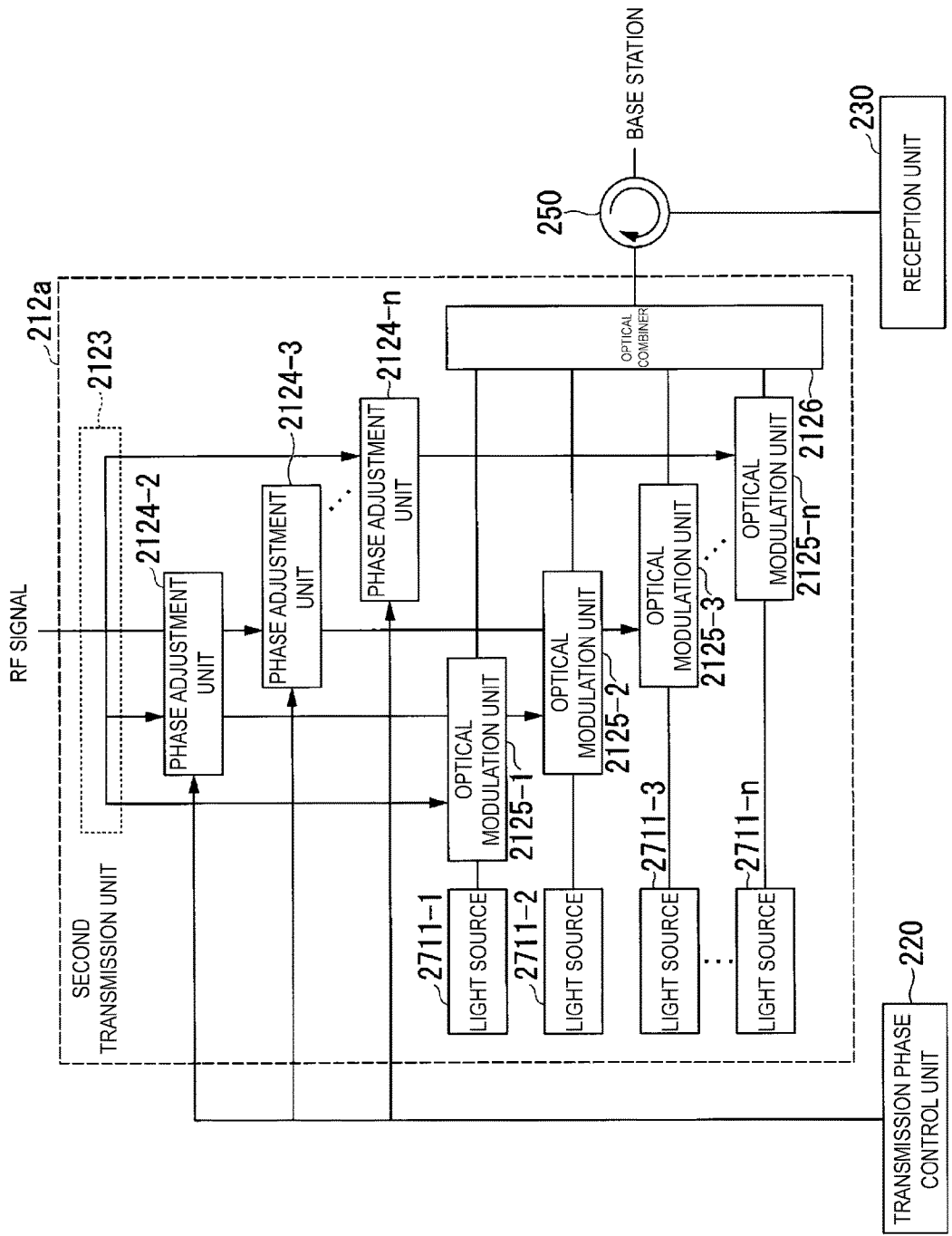
FIG. 18 is a block diagram illustrating a modification of the second transmission unit according to the embodiment.

FIG. 18 is a diagram illustrating the configuration of the second transmission unit 212$a$. In FIG. 18, the same parts as those of the second transmission unit 212 illustrated in FIG. 9 are denoted by the same reference signs and the description thereof will be omitted. The second transmission unit 212$a$ illustrated in FIG. 18 differs from the second transmission unit 212 illustrated in FIG. 9 in that it includes n light sources 2711-1, . . . , 2711-$n$ instead of the multi-wavelength light source 2121 and the optical demultiplexer 2122. The light sources 2711-$i$ ($i=1, \ldots, n$) output light of wavelengths $\lambda_{1i}$. The optical modulation units 2125-$i$ ($i=1, \ldots, n$) receive as inputs light of wavelengths $\lambda_{11}, \ldots, \lambda_{1n}$ from the light sources 2711-$i$.

Figure 19:
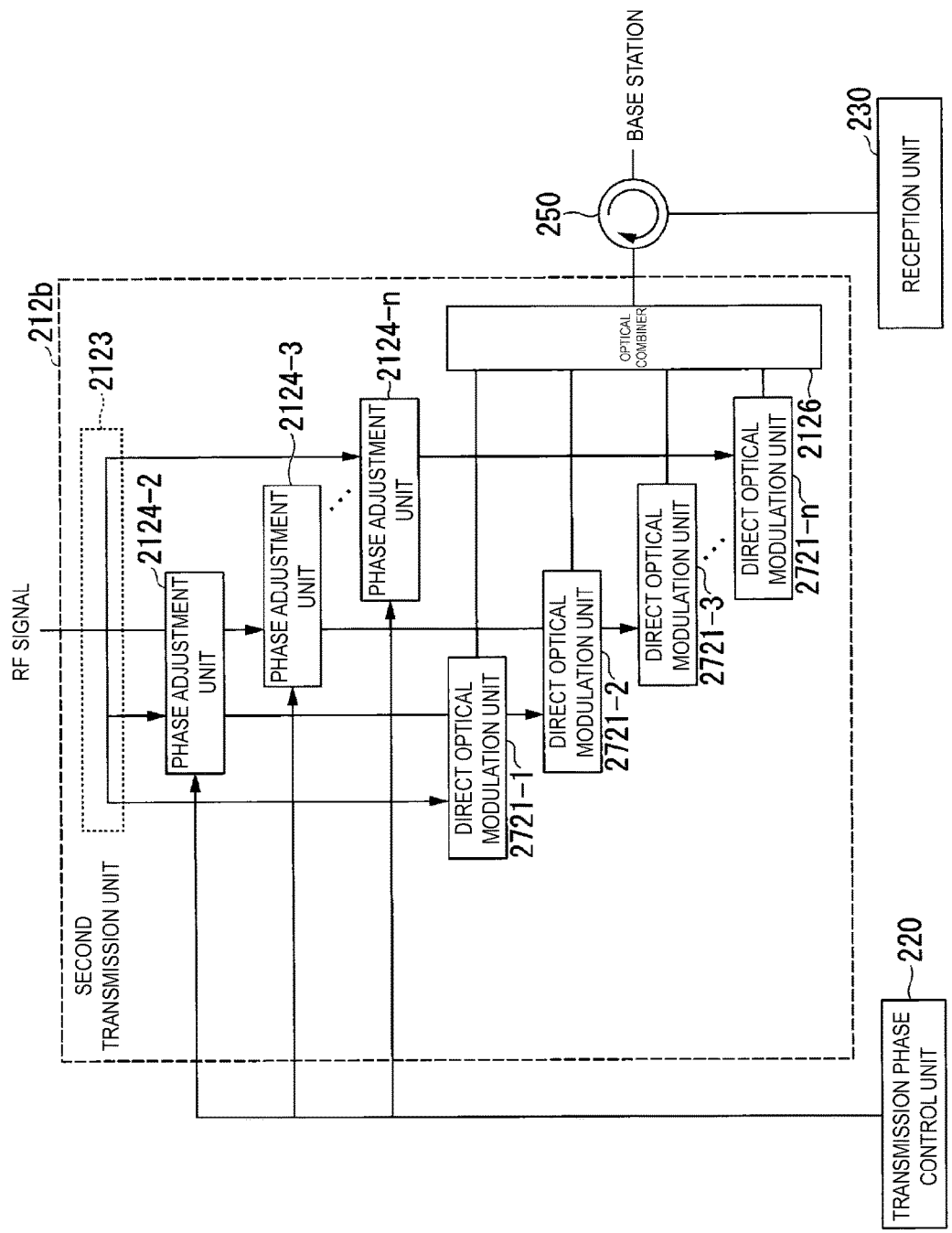
FIG. 19 is a block diagram illustrating a modification of the second transmission unit according to the embodiment.
Figure 20:
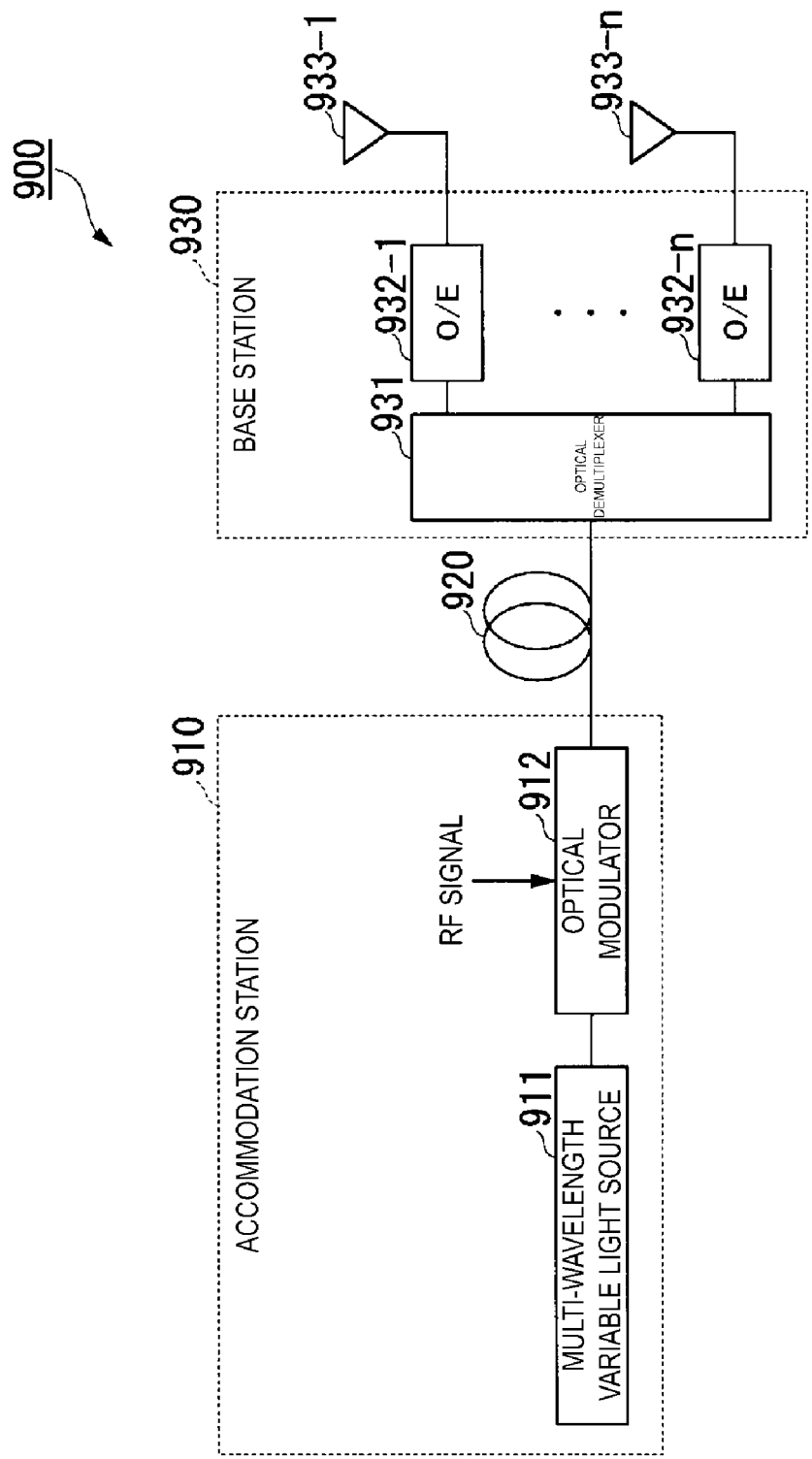
FIG. 20 is a block diagram illustrating a configuration of an RoF system to which the related art is applied.
Figure 21:
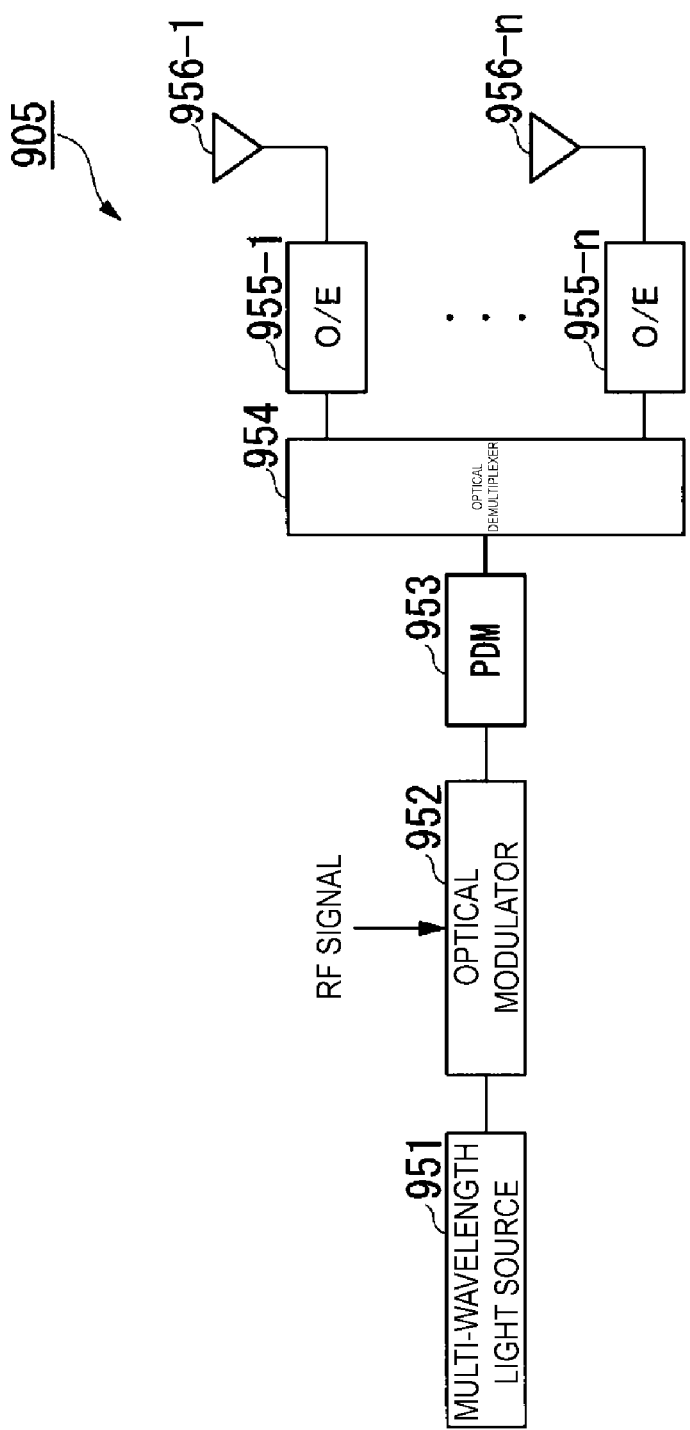
FIG. 21 is a block diagram illustrating a configuration of a wireless system to which the related art is applied.
Figure 22:
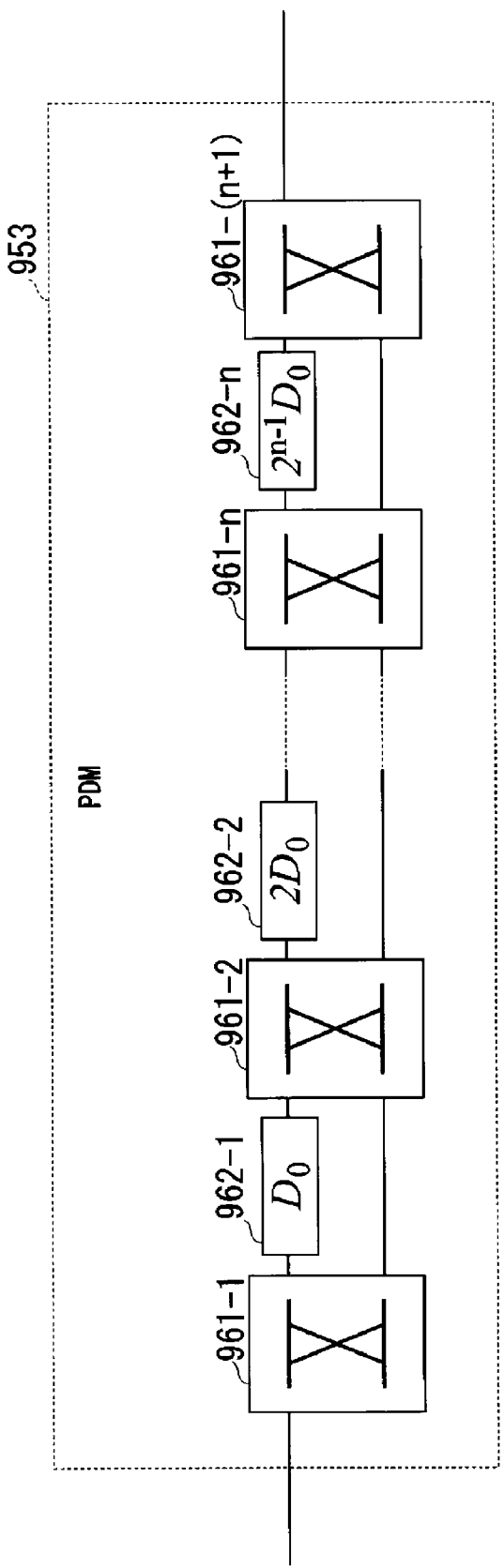
FIG. 22 is a block diagram illustrating a configuration of a PDM in FIG. 21.

FIG. 19 is a diagram illustrating the configuration of the second transmission unit 212$b$. In FIG. 19, the same parts as those of the second transmission unit 212 illustrated in FIG. 9 are denoted by the same reference signs and the description thereof will be omitted. The second transmission unit 212$b$ illustrated in FIG. 19 differs from the second transmission unit 212 illustrated in FIG. 9 in that it includes direct optical modulation units 2721-1, . . . , 2721-$n$ instead of the multi-wavelength light source 2121, the optical demultiplexer 2122, and the optical modulation units 2125-1, . . . , 2125-$n$. The direct optical modulation unit 2721-1 outputs an optically modulated signal obtained by modulating light of wavelength $\lambda_{1i}$ with an RF signal to the optical combiner 2126. Each direct optical modulation unit 2721-$i$ ($i=2, \ldots, n$) outputs an optically modulated signal obtained by modulating light of wavelength $\lambda_{1i}$ with an RF signal which has been phase-adjusted by the phase adjustment unit 2124-$i$ to the optical combiner 2126. The optical combiner 2126 combines the optically modulated signals of $\lambda_{11}, \ldots, \lambda_{1n}$ output respectively by the direct optical modulation units 2721-1, . . . , 2721-$n$ and outputs the combined optically modulated signal to the optical circulator 250.

6. Others

In the RoF system for beamforming according to the embodiment described above, n wavelengths that are set at equal intervals in a range in which chromatic dispersion in the optical fiber between the accommodation station and the base station can be regarded as constant are fixedly assigned to n antenna elements of the base station which are arranged at equal intervals. The accommodation station controls transmission and reception beam directions by adjusting the phases of optical signals of the wavelengths or modulated signals that modulate the optical signals of the wavelengths such that the amounts of phase shift of their RF signals are at equal intervals. In the control of the transmission beam direction, the base station transmits beacon signals a plurality of times while the accommodation station varies the transmission phase shift interval $\alpha_1$, and the terminal transmits information on a beacon signal with the maximum received power a plurality of times. In the control of the reception beam direction, the base station receives information on the beacon signal from the terminal and the accommodation station varies the reception phase shift interval $\alpha_2$ for information on each received beacon signal to determine a reception phase shift interval $\alpha_2$ which maximizes the received power. Further, the accommodation station determines the transmission phase shift interval $\alpha_1$ based on the information on the beacon signal received from the terminal. According to the present embodiment, a beamforming type RoF system which has a good wavelength utilization efficiency and does not require base station control even if distance information of the optical fiber between the accommodation station and the base station is unclear can be realized at low cost.

According to the embodiment described above, a wireless communication system includes an accommodation station apparatus, a base station apparatus that is connected to the accommodation station apparatus through an optical transmission line and has n antenna elements (where n is an integer of 2 or more), and a terminal that perform wireless communication with the base station apparatus. For example, the accommodation station apparatus is the accommodation station 20, the base station apparatus is the base station 40, the terminal is the terminal 50, and the optical transmission line is the optical fiber 30.

The accommodation station apparatus includes a transmission unit, a transmission phase control unit, a reception unit, a reception phase control unit, a transmission phase adjustment amount determination unit, and a reception phase adjustment amount determination unit. The transmission unit adjusts phases of optically modulated transmission signals, obtained respectively by modulating light of n different first wavelengths with a transmission signal, by first amounts of phase adjustment corresponding respectively to the n first wavelengths, and outputs a combined optically modulated transmission signal obtained by combining the phase-adjusted optically modulated transmission signals of the n first wavelengths to the optical transmission line. When transmitting p beacon signals (where p is an integer of 2 or more) as the transmission signals, the transmission phase control unit controls the transmission unit such that the transmission unit adjusts phases of the p beacons signals by the first amounts of phase adjustment which differ between the p beacon signals. The reception unit demultiplexes a combined optically modulated received signal transmitted through the optical transmission line into optically modulated received signals of n different second wavelengths, and converts the demultiplexed optically modulated received signals into electrical signals which have been phase-adjusted by second amounts of phase adjustment corresponding respectively to the n second wavelengths. When q combined optically modulated received signals (where q is an integer of 2 or more) indicating identification information (for example, beacon number information) of a beacon signal selected from the p beacon signals based on the terminal's received powers of the p beacon signals have been input from the optical transmission line, the reception phase control unit controls the reception unit such that the reception unit adjusts phases of the q combined optically modulated received signals by the second amounts of phase adjustment which differ between the q combined optically modulated received signals. The transmission phase adjustment amount determination unit controls the transmission unit such that the transmission unit performs phase adjustment by first amounts of phase adjustment that have been used for the beacon signal of the identification information indicated by the combined optically modulated received signals. The reception phase adjustment amount determination unit controls the reception unit such that the reception unit performs phase adjustment by second amounts of phase adjustment that have been used for a combined optically modulated received signal selected from the q combined optically modulated received signals based on received powers of electrical signals into which the q combined optically modulated received signals have been converted. For example, the transmission phase adjustment amount determination unit is the transmission phase control unit 220 and the reception phase adjustment amount determination unit is the reception phase control unit 240.

The base station apparatus includes a base station optical demultiplexing unit, an optical to electrical conversion unit, an electrical to optical conversion unit, and a base station optical combining unit. For example, the base station optical demultiplexing unit is the optical demultiplexer 41, the optical to electrical conversion unit is the O/E converter 42-1 to 42-n, the electrical to optical conversion unit is the E/O converter 44-1 to 44-n, and the base station optical combining unit is the optical combiner 45. The base station optical demultiplexing unit demultiplexes the combined optically modulated transmission signal transmitted through the optical transmission line into optically modulated transmission signals of the n different first wavelengths. The optical to electrical conversion unit converts the optically modulated transmission signals of the n first wavelengths into electrical signals and radiates the electrical signals wirelessly from the antenna elements corresponding respectively to the n first wavelengths. The electrical to optical conversion unit modulates optical signals of the n different second wavelengths corresponding respectively to the n antenna elements with wireless signals that the n antenna elements have received from the terminal to generate optically modulated received signals. The base station optical combining unit outputs a combined optically modulated received signal obtained by combining the optically modulated received signals of the n second wavelengths generated by the electrical to optical conversion unit to the optical transmission line.

The terminal includes a wireless reception unit, a wireless transmission unit, and a beacon selection unit. For example, the wireless reception unit is a combination of the antenna elements 51-1 to 51-m and the receiving antenna control unit 53, the wireless transmission unit is the transmitting antenna control unit 57 and the antenna elements 51-1 to 51-m, and the beacon selection unit is the maximum received power beacon selection unit 56. The wireless reception unit receives a wireless signal from the base station apparatus. The wireless transmission unit transmits a wireless signal to the base station apparatus. When the wireless reception unit has received the p beacon signals, the beacon selection unit causes the wireless transmission unit to transmit q wireless signals indicating the identification information of the beacon signal selected based on the received powers of the p beacon signals.

The n antenna elements may be arranged at intervals d. The n first wavelengths may be wavelengths $\lambda_{11}, \ldots, \lambda_{1n}$ at first wavelength intervals $\Delta\lambda_1$ included in a range in which chromatic dispersion in the optical transmission line can be regarded as constant. The n second wavelengths may be wavelengths $\lambda_{21}, \ldots, \lambda_{2n}$ at second wavelength intervals $\Delta\lambda_2$ included in a range in which chromatic dispersion in the optical transmission line can be regarded as constant. The n first amounts of phase adjustment may be amounts of phase adjustment which make phases of wireless signals spaced at first phase intervals $\alpha_1$, and the n second amounts of phase adjustment may be amounts of phase adjustment which make phases of wireless signals spaced at second phase intervals $\alpha_2$.

The transmission unit may include an optical modulation unit, a phase adjustment unit, and an optical combining unit. The optical modulation unit modulates light of the n different first wavelengths with the transmission signal to generate optically modulated transmission signals. The phase adjustment unit adjusts phases of the optically modulated transmission signals of the n first wavelengths generated by the optical modulation unit by the first amounts of phase adjustment corresponding respectively to the first wavelengths. The optical combining unit combines the optically modulated transmission signals of the n first wavelengths which have been phase-adjusted by the phase adjustment unit to generate a combined optically modulated transmission signal and outputs the combined optically modulated transmission signal to the optical transmission line.

The transmission unit may include a splitting unit, a phase adjustment unit, an optical modulation unit, and an optical combining unit. The splitting unit splits the transmission signal into n transmission signals corresponding respectively to the n different first wavelengths.

The phase adjustment unit adjusts phases of the n transmission signals split by the splitting unit by the first amounts of phase adjustment corresponding to the first wavelengths corresponding to the n transmission signals. The optical modulation unit modulates light of the n different first wavelengths with the transmission signals which have been phase-adjusted by the first amounts of phase adjustment corresponding to the first wavelengths to generate optically modulated transmission signals. The optical combining unit combines the optically modulated transmission signals of the n first wavelengths generated by the optical modulation unit to generate a combined optically modulated transmission signal and outputs the combined optically modulated transmission signal to the optical transmission line.

The reception unit may include a demultiplexing unit, a phase adjustment unit, a combining unit, and a conversion unit. The demultiplexing unit demultiplexes the combined optically modulated received signal into optically modulated received signals of the n different second wavelengths. The phase adjustment unit adjusts phases of the optically modulated received signals of the n second wavelengths demultiplexed by the demultiplexing unit by the second amounts of phase adjustment corresponding to the second wavelengths. The combining unit combines the optically modulated received signals of the n second wavelengths which have been phase-adjusted by the phase adjustment unit. The conversion unit converts the optically modulated received signals combined by the combining unit into electrical signals.

The reception unit may include a demultiplexing unit, a conversion unit, and a phase adjustment unit. The demultiplexing unit demultiplexes the combined optically modulated received signal into optically modulated received signals of the n different second wavelengths. The conversion unit converts the optically modulated received signals of the n second wavelengths demultiplexed by the demultiplexing unit into electrical signals. The phase adjustment unit adjusts phases of the n electrical signals obtained through conversion of the conversion unit by the second amounts of phase adjustment corresponding to the second wavelengths.

Although embodiments of the present invention have been described in detail with reference to the drawings, the specific configurations thereof are not limited to those of the embodiments and also include designs or the like without departing from the spirit of the present invention.

REFERENCE SIGNS LIST

10 Wireless communication system
20 Accommodation station
21 Phase adjustment unit
22 Optical combiner
23 Optical demultiplexer
24 Phase adjustment unit
30 Optical fiber
40 Base station
41 Optical demultiplexer
42-1 to 42-n O/E converter
43-1 to 43-n Antenna element
44-1 to 44-n E/O converter
45 Optical combiner
46 Optical circulator
47-1 to 47-n Electrical circulator
50 Terminal
51-1 to 51-m Antenna element
52-1 to 52-m Electrical circulator
53 Receiving antenna control unit
54 Received power calculation unit
55 Demodulation unit
56 Maximum received power beacon selection unit
57 Transmitting antenna control unit
210 Transmission unit
211, 211a, 211b, 211c, 211d First transmission unit
212, 212a, 212b Second transmission unit
220 Transmission phase control unit
230 Reception unit
231 First reception unit
232 Second reception unit
240 Reception phase control unit
250 Optical circulator
2111 Multi-wavelength light source
2112 Optical modulation unit
2113 Optical demultiplexer
2114-2 to 2114-n Phase adjustment unit
2115 Optical combiner
2121 Multi-wavelength light source
2122 Optical demultiplexer
2123 Splitting unit
2124-2 to 2124-n Phase adjustment unit
2125-1 to 2125-n Optical modulation unit
2126 Optical combiner
2311 Optical demultiplexer
2312-2 to 2312-n Phase adjustment unit
2313 Optical combiner
2314 O/E converter
2315 Received power calculation unit
2316 Demodulation unit
2321 Optical demultiplexer
2322-1 to 2322-n O/E converter
2323-2 to 2323-n Phase adjustment unit
2324 Received power calculation unit
2325 Demodulation unit
2611-1 to 2611-n Light source
2612 Optical combiner
2621 Optical demultiplexer
2622-1 to 2622-n Optical modulation unit
2631-1 to 2631-n Direct optical modulation unit
2711-1 to 2711-n Light source
2721-1 to 2721-n Direct optical modulation unit

The invention claimed is:

1. A wireless communication system comprising:
an accommodation station apparatus;
a base station apparatus that is connected to the accommodation station apparatus through an optical transmission line and has n antenna elements where n is an integer of 2 or more; and
a terminal configured to wirelessly communicate with the base station apparatus,
wherein
the accommodation station apparatus comprises:
a transmitter configured to adjust phases of optically modulated transmission signals, obtained respectively by modulating light of n different first wavelengths with a transmission signal, by first amounts of phase adjustment corresponding respectively to the n different first wavelengths and output a combined optically modulated transmission signal obtained by combining the phase-adjusted optically modulated transmission signals of the n different first wavelengths to the optical transmission line;
a transmission phase controller configured to, when transmitting p beacon signals where p is an integer of 2 or more as the transmission signal, control the transmitter such that the transmitter adjusts phases of the p beacons signals by the first amounts of phase adjustment which differ between the p beacon signals;
a receiver configured to demultiplex a combined optically modulated received signal transmitted through the optical transmission line into optically modulated received signals of n different second wavelengths and convert the demultiplexed optically modulated received signals into electrical signals which have been phase-adjusted by second amounts of phase adjustment corresponding respectively to the n different second wavelengths;
a reception phase controller configured to, when q combined optically modulated received signals where q is an integer of 2 or more indicating identification information of a beacon signal selected from the p beacon signals based on the terminal's received powers of the p beacon signals have been input from the optical transmission line, control the receiver such that the receiver adjusts phases of the q combined optically modulated received signals by the second amounts of phase adjustment which differ between the q combined optically modulated received signals;
a transmission phase adjustment amount determiner configured to control the transmitter such that the transmitter performs phase adjustment by the first amounts of phase adjustment that have been used for the beacon signal of the identification information indicated by the combined optically modulated received signals; and a reception phase adjustment amount determiner configured to control the receiver such that the receiver performs phase adjustment by the second amounts of phase adjustment that have been used for a combined optically modulated received signal selected from the q combined optically modulated received signals based on received powers of electrical signals into which the q combined optically modulated received signals have been converted, and the base station apparatus comprises:

a base station optical demultiplexer configured to demultiplex the combined optically modulated transmission signal transmitted through the optical transmission line into optically modulated transmission signals of the n different first wavelengths;

an optical to electrical converter configured to convert the optically modulated transmission signals of the n first wavelengths into electrical signals and radiate the electrical signals wirelessly from the antenna elements corresponding respectively to the n first wavelengths;

an electrical to optical converter configured to modulate optical signals of the n different second wavelengths corresponding respectively to the n antenna elements with wireless signals that the n antenna elements have received from the terminal to generate optically modulated received signals; and a base station optical combiner configured to output a combined optically modulated received signal obtained by combining the optically modulated received signals of the n second wavelengths generated by the electrical to optical converter to the optical transmission line, and the terminal comprises:

a wireless receiver configured to receive a wireless signal from the base station apparatus;

a wireless transmitter configured to transmit a wireless signal to the base station apparatus; and a beacon selector configured to, when the wireless receiver has received the p beacon signals, cause the wireless transmitter to transmit q wireless signals indicating the identification information of the beacon signal selected based on the received powers of the p beacon signals.

2. The wireless communication system according to claim 1, wherein the n antenna elements are arranged at predetermined intervals, the n first wavelengths are wavelengths at first wavelength intervals included in a range in which chromatic dispersion in the optical transmission line is capable of being regarded as constant, the n second wavelengths are wavelengths at second wavelength intervals included in a range in which chromatic dispersion in the optical transmission line is capable of being regarded as constant, the n first amounts of phase adjustment are amounts of phase adjustment which make phases of wireless signals spaced at first phase intervals, and the n second amounts of phase adjustment are amounts of phase adjustment which make phases of wireless signals spaced at second phase intervals.

3. The wireless communication system according to claim 1, wherein the transmitter includes:

an optical modulator configured to modulate light of the n different first wavelengths with the transmission signal to generate optically modulated transmission signals;

a phase adjuster configured to adjust phases of the optically modulated transmission signals of the n first wavelengths generated by the optical modulator by the first amounts of phase adjustment corresponding respectively to the first wavelengths; and an optical combiner configured to combine the optically modulated transmission signals of the n first wavelengths which have been phase-adjusted by the phase adjuster to generate a combined optically modulated transmission signal and output the combined optically modulated transmission signal to the optical transmission line.

4. The wireless communication system according to claim 1, wherein the transmitter includes:

a splitter configured to split the transmission signal into n transmission signals corresponding respectively to the n different first wavelengths;

a phase adjuster configured to adjust phases of the n transmission signals split by the splitter by the first amounts of phase adjustment corresponding to the first wavelengths corresponding to the n transmission signals;

an optical modulator configured to modulate light of the n different first wavelengths with the transmission signals which have been phase-adjusted by the first amounts of phase adjustment corresponding to the first wavelengths to generate optically modulated transmission signals; and an optical combiner configured to combine the optically modulated transmission signals of the n first wavelengths generated by the optical modulator to generate a combined optically modulated transmission signal and output the combined optically modulated transmission signal to the optical transmission line.

5. The wireless communication system according to claim 1, wherein the receiver includes:

a demultiplexer configured to demultiplex the combined optically modulated received signal into optically modulated received signals of the n second wavelengths;

a phase adjuster configured to adjust phases of the optically modulated received signals of the n second wavelengths demultiplexed by the demultiplexer by the second amounts of phase adjustment corresponding to the second wavelengths;

a combiner configured to combine the optically modulated received signals of the n second wavelengths which have been phase-adjusted by the phase adjuster; and a converter configured to convert the optically modulated received signals combined by the combiner into electrical signals.

6. The wireless communication system according to claim 1, wherein the receiver includes:

a demultiplexer configured to demultiplex the combined optically modulated received signal into optically modulated received signals of the n second wavelengths;

a converter configured to convert the optically modulated received signals of the n second wavelengths demultiplexed by the demultiplexer into electrical signals; and a phase adjuster configured to adjust phases of the n electrical signals obtained through conversion of the converter by the second amounts of phase adjustment corresponding to the second wavelengths.

7. An accommodation station apparatus connected to a base station apparatus through an optical transmission line, the base station apparatus being configured to perform wireless communication with a terminal through n antenna elements where n is an integer of 2 or more, the accommodation station apparatus comprising:
- a transmitter configured to adjust phases of optically modulated transmission signals, obtained respectively by modulating light of n different first wavelengths corresponding to the n antenna elements with a transmission signal, by first amounts of phase adjustment corresponding respectively to the n first wavelengths and output a combined optically modulated transmission signal obtained by combining the phase-adjusted optically modulated transmission signals of the n first wavelengths to the optical transmission line;
- a transmission phase controller configured to, when transmitting p beacon signals where p is an integer of 2 or more as the transmission signals, control the transmitter such that the transmitter adjusts phases of the p beacons signals by the first amounts of phase adjustment which differ between the p beacon signals;
- a receiver configured to demultiplex a combined optically modulated received signal transmitted through the optical transmission line into optically modulated received signals of n different second wavelengths corresponding to the n antenna elements and convert the demultiplexed optically modulated received signals into electrical signals which have been phase-adjusted by second amounts of phase adjustment corresponding respectively to the n second wavelengths;
- a reception phase controller configured to, when q combined optically modulated received signals where q is an integer of 2 or more indicating identification information of a beacon signal selected from the p beacon signals based on the terminal's received powers of the p beacon signals have been input from the optical transmission line, control the receiver such that the receiver adjusts phases of the q combined optically modulated received signals by the second amounts of phase adjustment which differ between the q combined optically modulated received signals;
- a transmission phase adjustment amount determiner configured to control the transmitter such that the transmitter performs phase adjustment by the first amounts of phase adjustment that have been used for the beacon signal of the identification information indicated by the combined optically modulated received signals; and
- a reception phase adjustment amount determiner configured to control the receiver such that the receiver performs phase adjustment by the second amounts of phase adjustment that have been used for a combined optically modulated received signal selected from the q combined optically modulated received signals based on received powers of electrical signals into which the q combined optically modulated received signals have been converted.

8. A wireless communication method for a wireless communication system, the wireless communication system including an accommodation station apparatus, a base station apparatus that is connected to the accommodation station apparatus through an optical transmission line and has n antenna elements where n is an integer of 2 or more, and a terminal configured to wirelessly communicate with the base station apparatus, the wireless communication method comprising:
- (i) by the accommodation station apparatus, adjusting phases of optically modulated transmission signals, obtained respectively by modulating light of n different first wavelengths with a transmission signal, by first amounts of phase adjustment corresponding respectively to the n different first wavelengths, and outputting a combined optically modulated transmission signal obtained by combining the phase-adjusted optically modulated transmission signals of the n different first wavelengths to the optical transmission line;
- (ii) by the accommodation station apparatus, when transmitting p beacon signals where p is an integer of 2 or more as the transmission signals in the step (i), performing control to adjust phases of the p beacons signals by the first amounts of phase adjustment which differ between the p beacon signals;
- (iii) by the accommodation station apparatus, demultiplexing a combined optically modulated received signal transmitted through the optical transmission line into optically modulated received signals of n different second wavelengths and converting the demultiplexed optically modulated received signals into electrical signals which have been phase-adjusted by second amounts of phase adjustment corresponding respectively to the n second wavelengths;
- (iv) by the accommodation station apparatus, when q combined optically modulated received signals where q is an integer of 2 or more indicating identification information of a beacon signal selected from the p beacon signals based on the terminal's received powers of the p beacon signals have been input from the optical transmission line, performing control to adjust phases of the q combined optically modulated received signals by the second amounts of phase adjustment which differ between the q combined optically modulated received signals in the step (iii);
- (v) by the accommodation station apparatus, performing control to perform phase adjustment by the first amounts of phase adjustment that have been used for the beacon signal of the identification information indicated by the combined optically modulated received signals in the step (i);
- (vi) by the accommodation station apparatus, performing control to perform phase adjustment by the second amounts of phase adjustment that have been used for a combined optically modulated received signal selected from the q combined optically modulated received signals based on received powers of electrical signals into which the q combined optically modulated received signals have been converted in the step (iii);
- (vii) by the base station apparatus, demultiplexing the combined optically modulated transmission signal transmitted through the optical transmission line into optically modulated transmission signals of the n different first wavelengths;
- (viii) by the base station apparatus, converting the optically modulated transmission signals of the n first wavelengths into electrical signals and radiating the electrical signals wirelessly from the antenna elements corresponding respectively to the n first wavelengths;
- (ix) by the base station apparatus, modulating optical signals of the n different second wavelengths corresponding respectively to the n antenna elements with wireless signals that the n antenna elements have received from the terminal to generate optically modulated received signals;

(x) by the base station apparatus, outputting a combined optically modulated received signal obtained by combining the optically modulated received signals of the n second wavelengths generated in the step (ix) to the optical transmission line;

(xi) by the terminal, receiving a wireless signal from the base station apparatus;

(xii) by the terminal, transmitting a wireless signal to the base station apparatus; and (xiii) by the terminal, when the p beacon signals have been received in the step (xi), causing q wireless signals indicating the identification information of the beacon signal selected based on the received powers of the p beacon signals to be transmitted in the step (xii).

* * * * *